(12) United States Patent
Highsmith et al.

(10) Patent No.: US 12,465,268 B2
(45) Date of Patent: Nov. 11, 2025

(54) GUIDING SHEATH WITH DISTAL TIP LOCATOR

(71) Applicant: Biosense Webster (Israel) Ltd., Yokneam (IL)

(72) Inventors: Debby Highsmith, Laguna Niguel, CA (US); Paul Suarez, La Crescenta, CA (US); Brandon Tran, Madison, WI (US); Tara Gomez-Hampton, Pasadena, CA (US); Elijah Li, Bronx, NY (US)

(73) Assignee: Biosense Webster (Israel) Ltd., Yokneam (IL)

( * ) Notice: Subject to any disclaimer, the term of this patent is extended or adjusted under 35 U.S.C. 154(b) by 819 days.

(21) Appl. No.: 17/484,729

(22) Filed: Sep. 24, 2021

(65) Prior Publication Data

US 2022/0110577 A1    Apr. 14, 2022

Related U.S. Application Data

(60) Provisional application No. 63/246,623, filed on Sep. 21, 2021, provisional application No. 63/090,442, filed on Oct. 12, 2020.

(51) Int. Cl.
*A61B 5/287* (2021.01)
*A61B 5/00* (2006.01)
(Continued)

(52) U.S. Cl.
CPC .............. *A61B 5/367* (2021.01); *A61B 5/287* (2021.01); *A61B 5/6852* (2013.01);
(Continued)

(58) Field of Classification Search
CPC ....... A61B 5/287; A61B 5/367; A61B 5/6852; A61B 2562/0257; A61B 2562/225;
(Continued)

(56) References Cited

U.S. PATENT DOCUMENTS 5,125,903 A    6/1992   McLaughlin et al.
5,147,336 A    9/1992   Wendell et al.
(Continued)

FOREIGN PATENT DOCUMENTS

CN      107028652 A    8/2017
EP      1 034 738 A1   9/2000
(Continued)

OTHER PUBLICATIONS

Extended European Search Report issued in Application No. EP 22174281.0; mailed Oct. 5, 2022; 10 pages.
(Continued)

*Primary Examiner* — Eun Hwa Kim

(57) ABSTRACT

A guiding sheath has a hemostatic valve and a central lumen into which a diagnostic or treatment catheter can be introduced and guided into a patient. The hemostatic valve also includes an electrically conducting element or proximity sensing element on its proximal end that interacts with a second electrically conducting element or proximity sensing element on a proximal end of the diagnostic or treatment catheter that can be passed through the central lumen of the guiding sheath and into the patient's heart. The interaction between the two electrically conducting elements or proximity sensing elements enables the location of the distal end of the diagnostic or treatment catheter in the patient's heart without the need for irradiating the patient.

17 Claims, 18 Drawing Sheets

(51) Int. Cl.
  *A61B 5/06* (2006.01)
  *A61B 5/367* (2021.01)
  *A61M 25/09* (2006.01)
  *A61M 39/06* (2006.01)

(52) U.S. Cl.
  CPC ............ *A61B 5/7405* (2013.01); *A61B 5/742* (2013.01); *A61M 25/09* (2013.01); *A61M 39/06* (2013.01); *A61B 2562/0223* (2013.01); *A61B 2562/0257* (2013.01); *A61M 2039/062* (2013.01)

(58) Field of Classification Search
  CPC ........ A61B 2562/226; A61B 2562/227; A61B 2562/228; A61B 2018/00351; A61B 2018/00357; A61B 2018/00375; A61B 2018/0038; A61B 2018/00386; A61B 2034/2046; A61B 2034/2051; A61B 2034/2053; A61B 2034/2059
  See application file for complete search history.

(56) References Cited

U.S. PATENT DOCUMENTS

| | | |
|---|---|---|
| 5,391,199 A | 2/1995 | Ben-Haim |
| 5,462,545 A | 10/1995 | Wang et al. |
| 5,584,830 A | 12/1996 | Ladd et al. |
| 5,807,350 A | 9/1998 | Diaz |
| 6,332,089 B1 | 12/2001 | Acker et al. |
| 6,484,118 B1 | 11/2002 | Govari |
| 6,565,562 B1 | 5/2003 | Shah et al. |
| 8,235,986 B2 | 8/2012 | Kulesa et al. |
| 8,456,182 B2 | 6/2013 | Bar-Tel et al. |
| 9,326,813 B2 | 5/2016 | Pike, Jr. et al. |
| 10,065,032 B2 | 9/2018 | Ollivier |
| 10,194,937 B2 | 2/2019 | Schultz |
| 10,413,707 B2 | 9/2019 | Douglas |
| 2002/0058933 A1 | 5/2002 | Christopherson et al. |
| 2003/0018246 A1 | 1/2003 | Govari et al. |
| 2003/0187369 A1 | 10/2003 | Lewis et al. |
| 2004/0082860 A1 | 4/2004 | Haissaguerre |
| 2004/0097804 A1* | 5/2004 | Sobe ................ A61B 17/3207 600/424 |
| 2004/0220471 A1 | 11/2004 | Schwartz |
| 2005/0055089 A1 | 3/2005 | Macoviak et al. |
| 2006/0064062 A1* | 3/2006 | Gurusamy .......... A61M 25/065 604/164.01 |
| 2006/0173381 A1 | 8/2006 | Eck |
| 2008/0140006 A1* | 6/2008 | Eskuri .................. A61B 5/6848 604/117 |
| 2010/0079158 A1 | 4/2010 | Bar-Tal et al. |
| 2012/0232546 A1 | 9/2012 | Mirza et al. |
| 2014/0100561 A1 | 4/2014 | Biadillah et al. |
| 2014/0275991 A1 | 9/2014 | Potter et al. |
| 2014/0276395 A1 | 9/2014 | Wilson et al. |
| 2015/0112316 A1 | 4/2015 | Cudak et al. |
| 2016/0058504 A1 | 3/2016 | Davies et al. |
| 2016/0081740 A1 | 3/2016 | Heckel et al. |
| 2016/0278841 A1 | 9/2016 | Panescu et al. |
| 2017/0100188 A1* | 4/2017 | Fang .................. A61B 18/1492 |
| 2017/0325899 A1* | 11/2017 | Potter .................... A61B 5/062 |
| 2018/0154114 A1* | 6/2018 | Tang ..................... A61M 39/06 |
| 2020/0000367 A1 | 1/2020 | Oren et al. |
| 2020/0008883 A1 | 1/2020 | Moak et al. |
| 2020/0038046 A1* | 2/2020 | Schwamb .......... A61B 17/1626 |
| 2020/0061340 A1 | 2/2020 | Mixter et al. |
| 2020/0129086 A1 | 4/2020 | Ganapathy et al. |
| 2021/0401483 A1 | 12/2021 | Highsmith |

FOREIGN PATENT DOCUMENTS

| | | |
|---|---|---|
| EP | 1151725 A1 | 11/2001 |
| EP | 1 325 708 A2 | 7/2003 |
| EP | 1 472 976 A1 | 11/2004 |
| EP | 2941188 B1 | 5/2018 |
| EP | 3649963 A2 | 5/2020 |
| JP | H08196543 A | 8/1996 |
| JP | 2006507884 A | 3/2006 |
| JP | 2010082446 A | 4/2010 |
| JP | 2010540198 A | 12/2010 |
| JP | 2016517299 A | 6/2016 |
| JP | 2019000671 A | 1/2019 |
| JP | 2022511121 A | 1/2022 |
| WO | 1996005768 A1 | 2/1996 |
| WO | WO 96/05768 A1 | 2/1996 |
| WO | WO 99/39624 A1 | 8/1999 |
| WO | WO 01/80922 A2 | 11/2001 |
| WO | WO 02/071955 A2 | 9/2002 |
| WO | 2009046441 A1 | 4/2009 |
| WO | WO-2010027693 A2 * | 3/2010 ....... A61B 17/00491 |
| WO | 2018165277 A1 | 9/2018 |
| WO | 2019109013 A1 | 6/2019 |
| WO | 2021014316 A1 | 1/2021 |
| WO | 2022046777 A1 | 3/2022 |

OTHER PUBLICATIONS

Extended European Search Report issued in Application No. 21182223.4; mailed Nov. 3, 2021; 10 pages.
International Search Report and Written Opinion dated Jun. 15, 2022, from corresponding International Application No. PCT/IB2021/059071.
Extended European Search Report and Opinion mailed Dec. 11, 2024, from corresponding European Application No. 24201859.6.
Search Reported and English translation mailed Jan. 9, 2025, from corresponding Japanese Application No. 2021107359.
Notice of Reasons for Refusal and English translation mailed Jan. 21, 2025, from corresponding Japanese Application No. 2021107359.
Knecht et al., Radiofrequency Puncture of the Fossa Ovalis for Resistant Transseptal Access, Jun. 23, 2008, Circulation: Arrhythmia and Electrophysiology. 2008; 1: 169-17 4 (Year: 2008).
Extended European Search Report dated Nov. 3, 2021, from corresponding European Application No. 21182223.4.
Extended European Search Report dated Oct. 5, 2022, from corresponding European Application No. 22174281.0.
Extended European Search Report dated Dec. 11, 2024, from corresponding European Application No. 24201859.6.
Written Opinion English translation dated Mar. 25, 2025, from corresponding Japanese Application No. 2021107359.
Notice of Reasons for Refusal English translation dated Apr. 15, 2025, from corresponding Japanese Application No. 2021107359.
Search Report English Translation dated May 26, 2025, from corresponding Japanese Application No. 2023521870.
Notice of Reasons for Refusal English translation dated Jun. 3, 2025, from corresponding Japanese Application No. 2023521870.
Written Opinion English translation dated Jun. 13, 2025, from corresponding Japanese Application No. 2021107359.
First Search Report dated Jul. 18, 2025, from corresponding Chinese Application No. CN202110735372.9.
First Office Action dated Jul. 18, 2025, from corresponding Chinese Application No. CN202110735372.9.
Written Opinion with English translation dated Jul. 30, 2025, from corresponding Japanese Application No. 2023521870.
Search Report with English translation dated Aug. 8, 2025, from corresponding Japanese Application No. 2022082173.

* cited by examiner

GUIDING SHEATH WITH DISTAL TIP LOCATOR

CROSS-REFERENCE TO RELATED APPLICATIONS

The present application claims benefit of priority to U.S. Provisional Patent Application No. 63/090,442 filed Oct. 12, 2020 and U.S. Provisional Patent Application No. 63/246,623 filed Sep. 21, 2021. The entire contents of which are hereby incorporated by reference.

FIELD OF INVENTION

This invention relates to a guiding sheath which is especially suitable for guiding electrophysiology catheters, in particular, a guiding sheath with a distal tip locator.

BACKGROUND

In medical procedures involving a patient's heart, there are numerous diagnostic and therapeutic procedures that include transseptal left heart catheterization, i.e. catherization through the left atrium. The transseptal approach provides access for both interventional cardiologists who perform antegrade mitral balloon valvuloplasty and for cardiac electrophysiologists who ablate left sided accessory pathways or perform transcatheter atrial-fibrillation therapeutic tactics. These tactics are often used in combination with guiding sheaths.

Guiding sheaths are well known for use in facilitating pathway for a diagnostic or treatment catheter. Catheterization of the human heart often necessitates having a catheter gain access to the heart chambers, via a femoral vein. To provide variation in movement, guiding sheaths (much like the catheters that are passed through the guiding sheaths) may be steerable or deflectable with the use of one or more puller wires for improved maneuverability in the patient's vasculature.

Accordingly, there is a desire for a guiding sheath with improved deflection characteristics and smoother operation in deflection mechanisms of the control handle.

In addition, during these procedures a large number of physicians use fluoroscopy to perform a transseptal puncture. The reason for the use of fluoroscopy is due to the physician needing to know where in the heart the most distal end of a diagnostic or treatment catheter such as a dilator is located. The end of the dilator is the portion of the system that punctures (e.g., with a needle) and then crosses into the left atrium first. It is not ideal to utilize fluoroscopy due to radiation exposure. Thus, there needs to be a non-radiation based way to locate the distal end of the diagnostic or treatment catheter (e.g., a dilator) at the point of transseptal puncture.

SUMMARY OF THE INVENTION

The present invention provides a method to locate the distal end of a diagnostic or treatment catheter without the use of radiation. To carry out this method, the guiding sheath can be configured to interact with the diagnostic or treatment catheter so as to provide confirmation that the diagnostic or treatment catheter is fully engaged with the guiding sheath. For example and not limitation, this confirmation can be provided by adding electrically conductive elements or other proximity sensing elements to each of the guiding sheath and the diagnostic or treatment catheter that, upon contact with one another, complete a circuit and provide a visual or audio confirmation of contact. These electrically conductive elements or proximity sensing elements are located on the proximal (i.e., closer to the operator) end of the guiding sheath and the diagnostic or treatment catheter.

Another example can be that a hemostatic valve on a proximal end of the control handle has a first proximity sensing element configured to interact with a second proximity sensing element on a proximal end of the diagnostic or treatment catheter. The proximity sensing elements can detect the proximity of each other using electrical, optical, physical and magnetic sensing.

An example guiding sheath assembly can comprise an elongated shaft and a control handle proximal of the shaft, the control handle having a longitudinal axis. The control handle can include a rotatable shaft, a pinion, and first and second shuttles. The shaft can be configured to rotate about the longitudinal axis. The first shuttle can be configured for translation along the longitudinal axis in one direction in response to rotation of the rotatable shaft, and the first shuttle can have a first plurality of teeth. The pinion can be in engagement with the first plurality of teeth, and configured for rotation about an axis generally perpendicular to the longitudinal axis in response to the translation of the first shuttle. The second shuttle can have a second plurality of teeth in engagement with the pinion and can be configured for translation along the longitudinal axis in another direction opposite to the one direction in response to rotation of the pinion. The guiding sheath assembly also can have a first puller wire extending along one side of the shaft and can have a proximal end portion responsive to at least translation of the first shuttle in a proximal direction, and a second puller wire extending along another side of the shaft and having a proximal end portion response to at least translation of the second shuttle in the proximal direction.

The control handle can also include a hemostatic valve and a center lumen that are configured to interact with a diagnostic or treatment catheter. The control handle and the diagnostic or treatment catheter can comprise electrically conducting elements or proximity sensing elements that are configured to indicate engagement of the diagnostic or treatment catheter with the control handle. In an example, the electrically conducting elements or proximity conducting elements can be located on a surface of the hemostatic valve and a surface of the diagnostic or treatment catheter. In another example, the electrically conducting elements or proximity sensing elements can be located on a surface of the control handle distal of the hemostatic valve and a surface of the diagnostic or treatment catheter.

The control handle can include a control knob and the rotatable shaft can be configured to rotate in response to rotation of the control knob.

The rotatable shaft can have an inner passage configured to receive a first distal portion of the first shuttle and a second distal portion of the second shuttle.

The first and second distal portions can be configured to form a cylindrical form when the first and second shuttles are laterally even with each other along the longitudinal axis.

An inner surface of the inner passage can be threaded and an outer surface of the first distal portion can be threaded and engaged with the inner surface.

The rotational shaft can be rotationally and translationally coupled to the control knob.

The rotational shaft can be rotationally coupled to the control knob by a longitudinal ridge formed on an outer surface of the shaft.

The rotational shaft can be rotationally coupled to the control knob by a pin extending through a portion of the control knob and slot formed in the rotational shaft.

The rotational shaft can be rotationally and translationally coupled to the control knob at its distal end.

The control handle can include a neutral indicator.

The neutral indicator can include a first member on the first shuttle and a second member on the second shuttle, wherein the first and second members are configured for releasable engagement.

The neutral indicator can be configured to provide resistance to disengagement and re-engagement.

The first neutral indicator can include a tapered projection, and the second neutral indicator includes a tapered recess.

The following discussion of an example including electrically conducting elements on the hemostatic valve of the control handle interacting with electrically conducting elements on the diagnostic or treatment catheter is for explanation only and does not limit the location of the electrically conducting elements to the hemostatic valve, nor exclude the use of proximity sensing elements.

In an example, an outwardly facing first conducting element on the control handle (e.g., on a surface of the hemostatic valve or on a surface of the control handle distal of the hemostatic valve) can interact with an inwardly facing second conducting element on a surface of the diagnostic or treatment catheter. In an example, an inwardly facing first conducting element on the control handle (e.g., on a surface of the hemostatic valve or on a surface of the control handle distal of the hemostatic valve) can interact with an outwardly projecting element on a surface of the diagnostic or treatment catheter.

In an example, the hemostatic valve can include a first electrically conducting element on a proximal end of the control handle that completes a circuit with a second electrically conducting element on a proximal end of the diagnostic or treatment catheter.

A proximal end of the control handle can include at least one first electrically conducting element that projects outward (e.g., away from the center lumen of the control handle, such as towards an external face of the hemostatic valve) or inward (e.g., toward the center lumen of the control handle) and completes a circuit with at least one second electrically conducting element on a proximal end of the diagnostic or treatment catheter. The at least one second electrically conducting element can be configured so as to interact with an outwardly projecting first electrically conducting element (e.g., the second electrically conducting element can project outward or inward from the surface of the diagnostic or treatment catheter to complete a circuit with an outwardly projecting first electrically conducting element located on an external face of the hemostatic valve) or an inwardly projecting first electrically conducting element (e.g., the second electrically conducting element is located on or proximal the surface of the diagnostic or treatment catheter) to complete a circuit with an inwardly projecting first electrically conducting element that projects into the central lumen of the control handle.

In an example, an outwardly facing first conducting element on the control handle and distal of the hemostatic valve can interact with an inwardly facing second conducting element on a surface of the diagnostic or treatment catheter. In an example, an inwardly facing first conducting element on the control handle can interact with an outwardly projecting element on a surface of the diagnostic or treatment catheter.

In an example, the control handle can include a first electrically conducting element distal of the hemostatic valve of the control handle that completes a circuit with a second electrically conducting element on a proximal end of the diagnostic or treatment catheter.

A proximal end of the control handle can include at least one first electrically conducting element that is distal of the hemostatic valve and projects outward (e.g., away from the center lumen of the control handle) or inward (e.g., toward the center lumen of the control handle) and completes a circuit with at least one second electrically conducting element on a proximal end of the diagnostic or treatment catheter. The at least one second electrically conducting element can be configured so as to interact with an outwardly projecting first electrically conducting element (e.g., the second electrically conducting element can project outward or inward from the surface of the diagnostic or treatment catheter to complete a circuit with an outwardly projecting first electrically conducting element located distal of the hemostatic valve or an inwardly projecting first electrically conducting element (e.g., the second electrically conducting element is located on or proximal the surface of the diagnostic or treatment catheter) to complete a circuit with an inwardly projecting first electrically conducting element that projects into the central lumen of the control handle.

In an example, multiple first electrically conducting elements project radially from the control handle, either outwardly on an external face of the hemostatic valve or inwardly towards the center lumen of the control handle, and are configured to form a circuit with multiple second electrically conducting elements that project radially outwardly from the surface of the diagnostic or treatment catheter to interact with first electrically conducting elements on an external face of the hemostatic valve, or with first electrically conducting elements projecting inwardly towards the center lumen of the control handle. In an example, the first electrically conducting element is present on an external face of the hemostatic valve, and the second electrically conducting element is present on a portion of the diagnostic or treatment catheter that is configured to cover the external face of the hemostatic valve.

The at least one first electrically conducting element and at least one second electrically conducting element can include a group of contacts or can be a single contact. The control handle can include two or more first electrically conducting elements which can be spaced equally apart (e.g., symmetrically spaced), or can be asymmetrically spaced. For example, two first electrically conducting elements can be spaced 180 degrees apart or on opposite sides of the control handle, or can be spaced 90 degrees apart. Without wishing to be bound by theory, it is possible that an increased spacing between the contacts can reduce the risk of shorting the electrically conducting elements, e.g., due to splash from saline, blood, or other fluid. Also, it is possible that positioning the contacts in an asymmetric way can help to avoid incorrect mating between the control handle and the diagnostic or treatment catheter (i.e., there is only one possible mating orientation), optionally including in combination with other proximity sensing elements or interacting elements.

The at least one first and second electrically conducting elements can include a portion to clean or wipe away liquid from the contacting surfaces of the elements before they interact.

The at least one first electrically conducting element can be in the form of a pin or socket. The at least one second electrically conducting element can be in the form of a socket or pin, selected to interact with the at least one first electrically conducting element (e.g., if the first electrically conducting element is a pin, then the second electrically conducting element is a socket). The pin and/or socket can be coated with a polymer to allow the connected pin and socket to be sealed (i.e., liquid-tight) once the pin and socket fully interact. The socket can include a vent or hole to allow fluid to be pushed out of the socket as the pin is introduced into the socket. Each of the pin and/or socket can include multiple electrically conducting elements to enable a single pin and socket pair to provide multiple electrical connections. A protective element can at least partially surround a pin to prevent it from bending.

Any of the first and second electrically conducting elements discussed herein can be combined with any of the proximity sensing elements, neutral indicators, visual indicators, and/or auditory indicators discussed herein.

The circuit can be configured to provide a visual or auditory indicator upon completion of the circuit. The visual or auditory indicator can be provided to a system configured to interact with the guiding sheath assembly.

The diagnostic or treatment catheter can comprise a dilator, a transseptal needle, a mapping catheter, and/or an ablation catheter.

Another example guiding sheath assembly can comprise an elongated shaft, and a control handle proximal of the shaft. The control handle can have a longitudinal axis, and can include a control knob configured to rotate about the longitudinal axis, and a hollow rotatable shaft configured for rotation about the longitudinal axis in response to rotation of the control knob. The control handle can also include a first shuttle configured for translation along the longitudinal axis in one direction in response to rotation of the rotatable shaft, and the first shuttle can have a first plurality of teeth, a pinion in engagement with the first plurality of teeth. The pinion can be configured to rotate about an axis generally perpendicular to the longitudinal axis in response to the translation of the first shuttle. The control handle can include a second shuttle that can have a second plurality of teeth in engagement with the pinion, the second shuttle configured to translate along the longitudinal axis in another direction opposite to the one direction in response to rotation of the pinion. The guiding sheath assembly can further include a first puller wire extending along one side of the shaft and can have a proximal end portion responsive to at least translation of the first shuttle in a proximal direction, and a second puller wire extending along another side of the shaft and can have a proximal end portion responsive to at least translation of the second shuttle in the proximal direction. The control handle can also include a hemostatic valve and a center lumen that are configured to interact with a diagnostic or treatment catheter. The control handle and the diagnostic or treatment catheter can comprise electrically conducting elements that are configured to indicate engagement of the diagnostic or treatment catheter with the control handle.

In some embodiments, a control handle for use in controlling deflection of a medical guiding sheath shaft, includes a control knob that can be configured to rotate about a longitudinal axis of the control handle, and a hollow rotatable shaft that can be configured to rotate about the longitudinal axis in response to rotation of the control knob. The control handle also includes a first shuttle that can be configured to translate along the longitudinal axis in one direction in response to rotation of the rotatable shaft, wherein the first shuttle can have a first plurality of teeth. The control handle can further include a pinion in engagement with the first plurality of teeth, wherein the pinion can be configured to rotate about an axis generally perpendicular to the longitudinal axis in response to the translation of the first shuttle. The control handle can also include a second shuttle that can have a second plurality of teeth in engagement with the pinion, and the second shuttle can be configured to translate along the longitudinal axis in another direction opposite to the one direction in response to rotation of the pinion, wherein the first and second shuttles can be configured to respectively act first and second puller wires extending along the guiding sheath shaft. The control handle can also include a hemostatic valve and a center lumen that are configured to interact with a diagnostic or treatment catheter. The control handle and the diagnostic or treatment catheter can comprise electrically conducting elements that are configured to indicate engagement of the diagnostic or treatment catheter with the control handle when the elements contact one another and complete a circuit.

In some embodiments, distal ends of the first and second shuttles can extend into a proximal portion of the rotatable shaft.

In some embodiments, an inner surface of the rotatable shaft can be threaded and an outer surface of the first shuttle can be threaded for rotationally coupling the rotatable shaft and the first shuttle.

In some embodiments, the first shuttle can be directly responsive to rotation of the rotatable shaft and the second shuttle can be directly responsive to rotation of the pinion.

BRIEF DESCRIPTION OF THE DRAWINGS

These and other features and advantages of the present invention will be better understood by reference to the following detailed description when considered in conjunction with the accompanying drawings. It is understood that selected structures and features have not been shown in certain drawings so as to provide better viewing of the remaining structures and features.

FIG. 13A, left panel, illustrates a possible interaction between the first and second electrically conducting elements, with the first electrically conducting element in the form of sockets on an external face of the hemostatic valve and the second electrically conducting element in the form of pins projecting outward from the diagnostic or treatment catheter. FIG. 13A, right panel, shows a schematic of this interaction. FIG. 13B shows a schematic of a pin-and-socket interaction in which the pin and socket each have a plurality of conducting portions that interact to form a circuit when the pin and socket are fully engaged. The socket includes a vent or hole for liquid or fluid to be expelled from the socket caused by the introduction of the pin.

FIG. 14A illustrates a possible interaction between the first electrically conducting element located on the control handle distal of the hemostatic valve and a second electrically conducting element located on a projection of the diagnostic or treatment catheter. FIG. 14B illustrates a possible interaction between the first electrically conducting element located on the control handle distal of the hemostatic valve and a second electrically conducting element located on the diagnostic or treatment catheter.

DETAILED DESCRIPTION OF THE INVENTION

Figure 1:
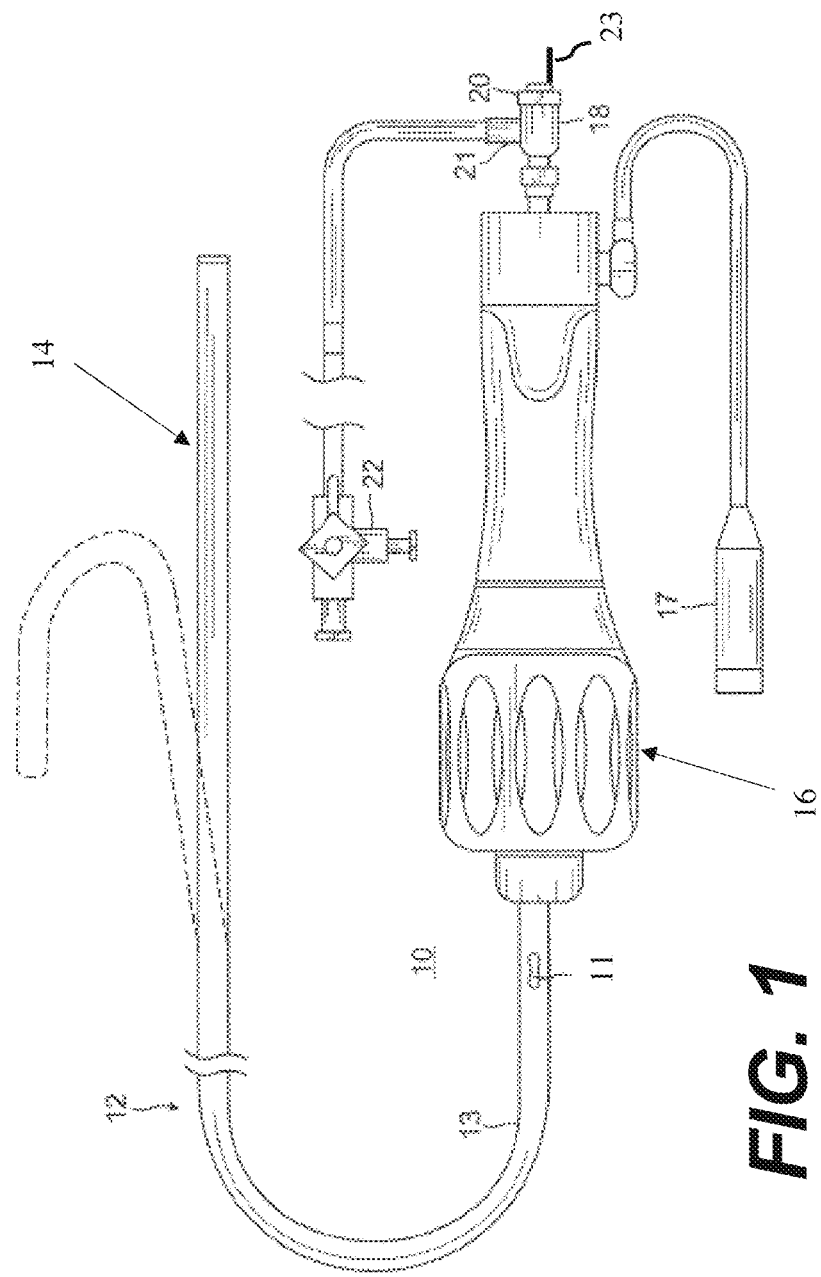
FIG. 1 is a top plan view of a guiding sheath including a control handle, in accordance with an embodiment of the present invention.

As used herein, the terms "about" or "approximately" for any numerical values or ranges indicate a suitable dimensional tolerance that allows the part or collection of components to function for its intended purpose as described herein. More specifically, "about" or "approximately" may refer to the range of values ±20% of the recited value, e.g. "about 90%" may refer to the range of values from 71% to 99%.

As used herein, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal. Computer readable medium can be non-transitory. Non-transitory computer-readable media include, but are not limited to, random access memory (RAM), read-only memory (ROM), electronically erasable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other tangible, physical medium which can be used to store computer readable instructions and/or data.

As used herein, the term "computing system" is intended to include stand-alone machines or devices and/or a combination of machines, components, modules, systems, servers, processors, memory, detectors, user interfaces, computing device interfaces, network interfaces, hardware elements, software elements, firmware elements, and other computer-related units. By way of example, but not limitation, a computing system can include one or more of a general-purpose computer, a special-purpose computer, a processor, a portable electronic device, a portable electronic medical instrument, a stationary or semi-stationary electronic medical instrument, or other electronic data processing apparatus.

As used herein, the term "non-transitory computer-readable media" includes, but is not limited to, random access memory (RAM), read-only memory (ROM), electronically erasable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other tangible, physical medium which can be used to store computer readable information.

Figure 2:
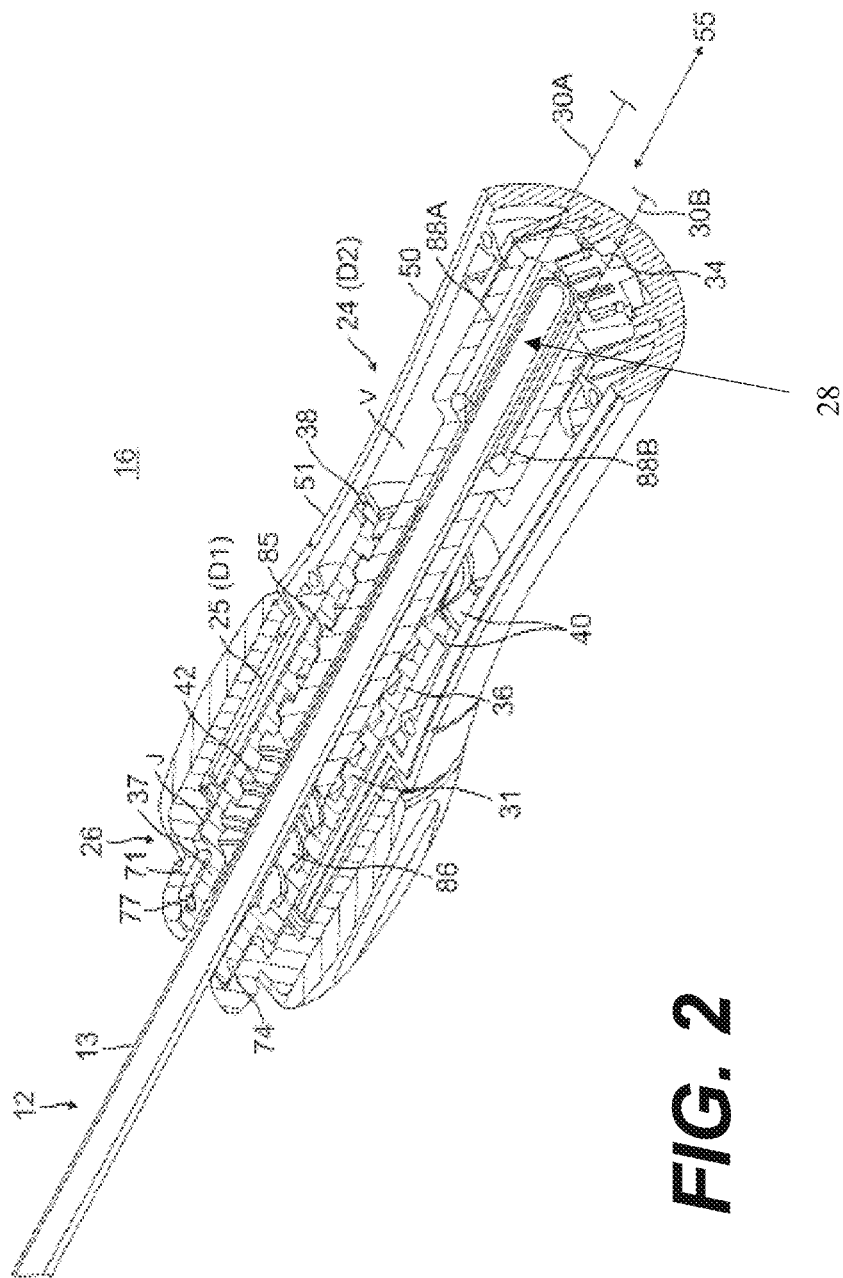
FIG. 2 is a longitudinal cross-sectional view of a control handle of FIG. 1.

Referring to FIG. 1, in some embodiment of present invention, a guiding sheath assembly 10 includes an elongated and flexible sheath 12, and a control handle 16 proximal of sheath 12. The sheath 12 includes a proximal section 13 and a distal deflection section 14. The control handle 16 may be connected to an electrical connector 17 for transmitting electrical signals, as sensed by one or more ring electrodes 19 carried on the sheath 12, including, for example, the deflection section 14. Also attached to the control handle 16, as shown in FIG. 1, is a hemostatic valve 18 adapted to receive a diagnostic or treatment catheter (shown as 750 in FIGS. 7A, 7B, and 8) that can be advanced through a lumen 28 defined by the hemostatic valve 18 as well as the guiding sheath assembly 10 (FIGS. 1 and 2) and the control handle 16 (FIGS. 1 and 2). The hemostatic valve 18 also has side port 21 terminating in a luer hub, such as a two-way stop cock 22, for connection to one or more fluid sources (not shown) for providing fluid into and through the valve cap 20 of the guiding sheath assembly 10. The proximal end 23 of hemostatic valve 18 also has an electrically conducting element 24*a* that is configured to interact with another electrically conducting element 24*b* located on the proximal end of the diagnostic or treatment catheter 750 in order to indicate engagement of the diagnostic or treatment catheter 750 with the hemostatic valve 18. This engagement completes a circuit between the proximal end 23 of the hemostatic valve 18 and the proximal end of the diagnostic or treatment catheter 750. This engagement can be indicated by a visual or auditory signal provided to the computer system shown in FIG. 8.

Figure 12:
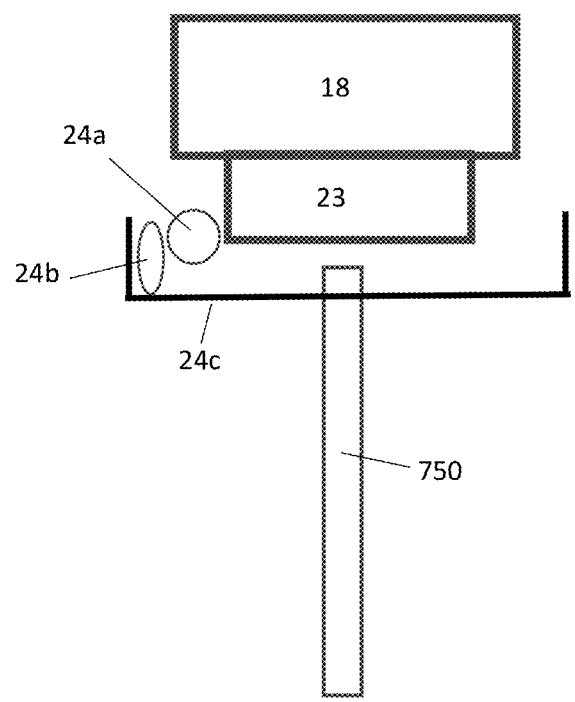
FIG. 12 illustrates a top view of another embodiment of a control handle with an externally facing first electrically conducting element on an external face of the hemostatic valve, and a diagnostic or treatment catheter including a projection to interact with the hemostatic valve and a second electrically conducting element positioned on the projection so as to form a circuit with the first electrically conducting element.

As shown in FIG. 12, a proximal end of the control handle can include at least one first electrically conducting element 24a that projects outward (e.g., away from the center lumen of the control handle, such as towards an external face of the hemostatic valve) or inward (e.g., toward the center lumen of the control handle) and completes a circuit with at least one second electrically conducting element 24b on a proximal end of the diagnostic or treatment catheter. The at least one second electrically conducting element 24b can be configured so as to interact with an outwardly projecting first electrically conducting element 24a (e.g., the second electrically conducting element 24b can project outward or inward from the surface of the diagnostic or treatment catheter to complete a circuit with an outwardly projecting first electrically conducting element 24a located on an external face of the hemostatic valve) or an inwardly projecting first electrically conducting element 24a (e.g., the second electrically conducting element 24b is located on or proximal the surface of the diagnostic or treatment catheter) to complete a circuit with an inwardly projecting first electrically conducting element 24a that projects into the central lumen of the control handle. In an example, multiple first electrically conducting elements 24a project radially from the control handle, either outwardly on an external face of the hemostatic valve or inwardly towards the center lumen of the control handle, and are configured to form a circuit with multiple second electrically conducting elements 24b that project radially outwardly from the surface of the diagnostic or treatment catheter to interact with first electrically conducting elements 24a on an external face of the hemostatic valve, or with first electrically conducting elements 24a projecting inwardly towards the center lumen of the control handle. In an example, a first electrically conducting element 24a is present on an external face of the hemostatic valve, and a second electrically conducting element 24b is present on a portion 24c of the diagnostic or treatment catheter that is configured to cover or interact with the external face of the hemostatic valve, as shown in FIG. 12.

The at least one first electrically conducting element 24a and at least one second electrically conducting element 24b can include a group of contacts or can be a single contact. The control handle can include two or more first electrically conducting elements 24a which can be spaced equally apart (e.g., symmetrically spaced), or can be asymmetrically spaced. For example, two first electrically conducting elements 24a can be spaced 180 degrees apart or on opposite sides of the control handle, or can be spaced 90 degrees apart.

One or both of the at least one first electrically conducting element 24a and at least second electrically conducting element 24b can include a portion to clean or wipe away liquid from the contacting surfaces of the elements before they interact.

Figure 13A:
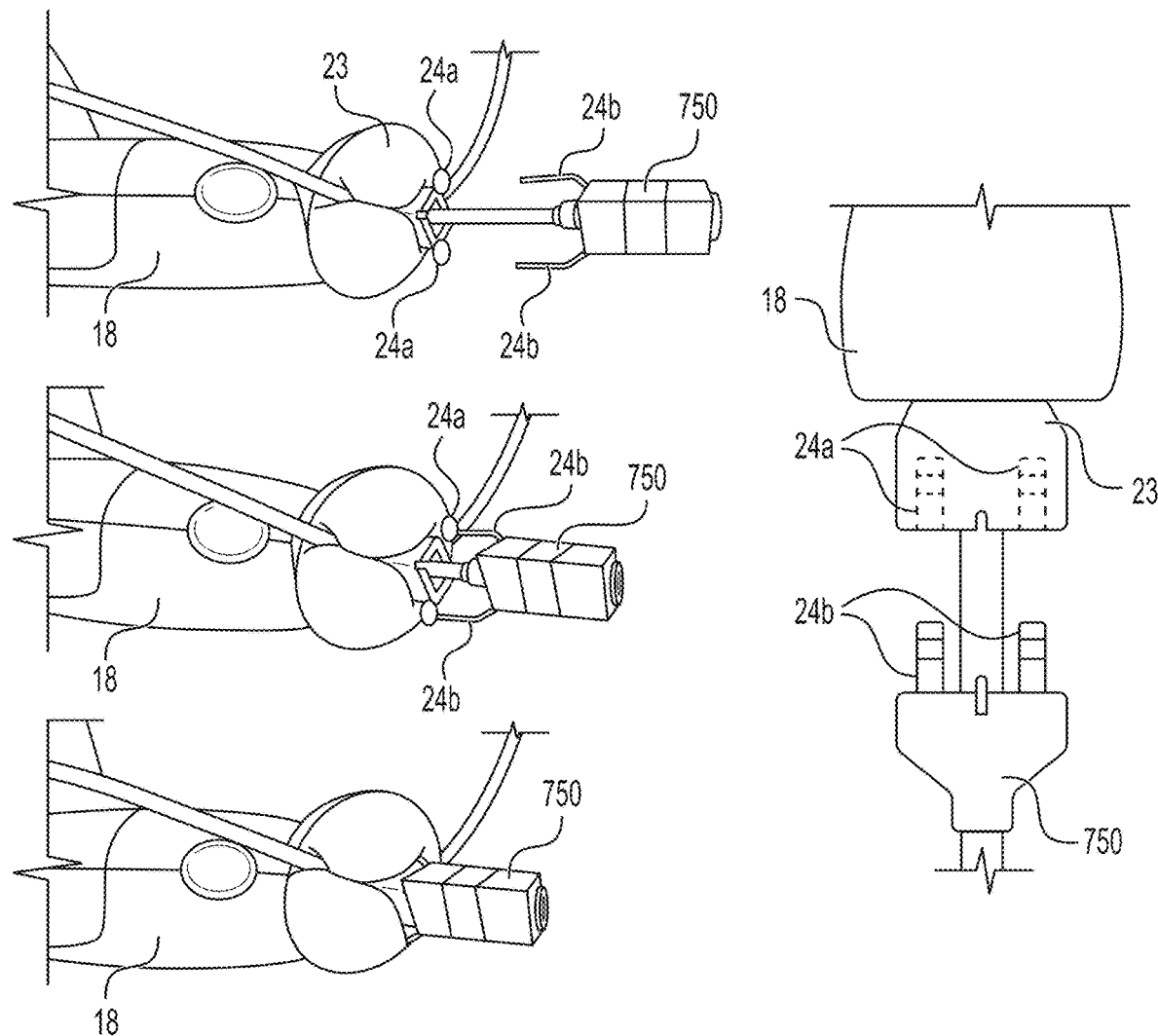
FIG. 13A-13B illustrate an embodiment of a first electrically conducting element and a second electrically conducting element in the form of a pin and socket.
Figure 13B:
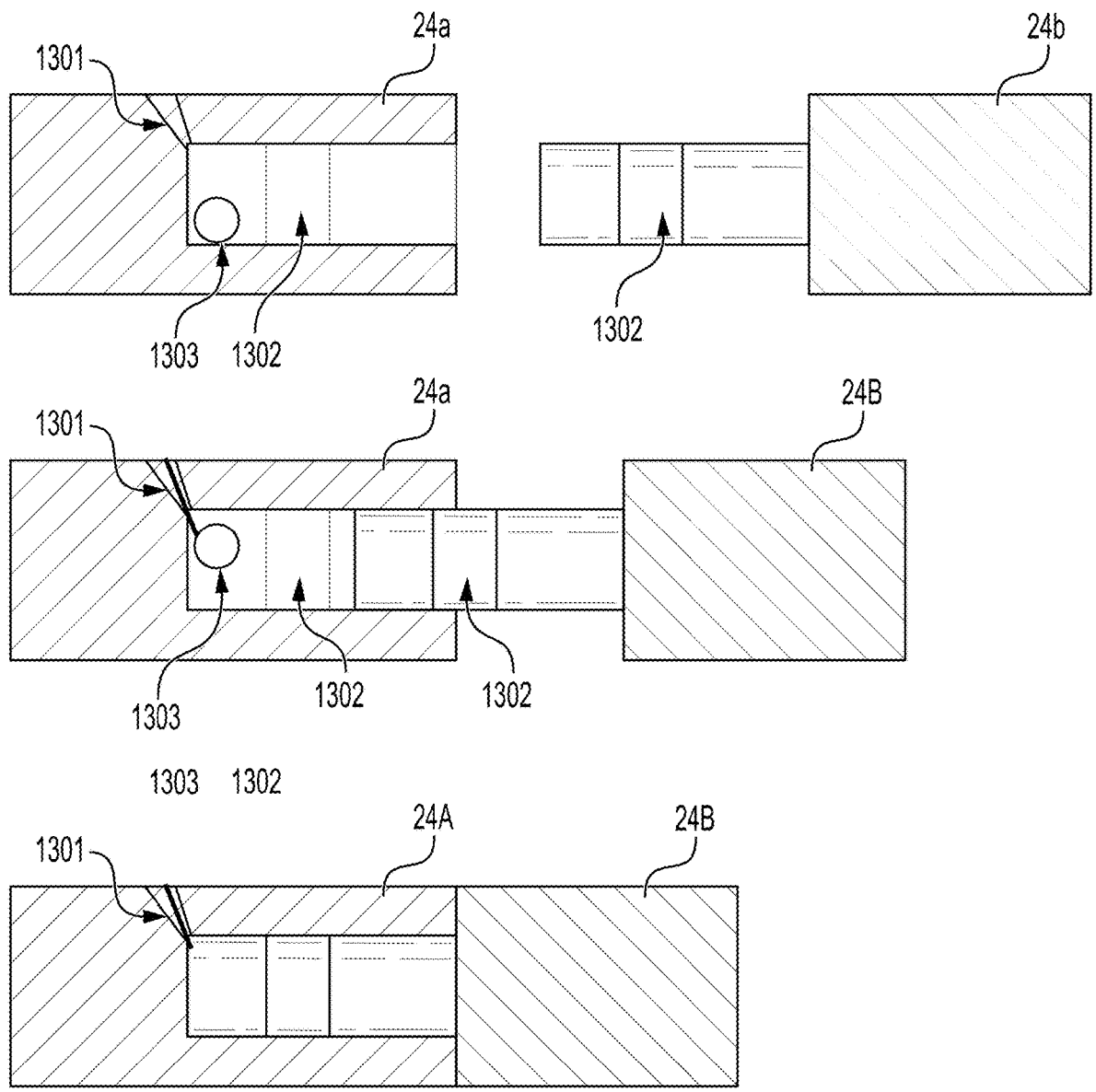

The at least one first electrically conducting element 24a can be in the form of a pin or socket. The at least one second electrically conducting element 24b can be in the form of a socket or pin, selected to interact with the at least one first electrically conducting element 24a (e.g., if the first electrically conducting element 24a is a pin, then the second electrically conducting element 24b is a socket), as shown in FIG. 13A. The pin and/or socket can be coated with a polymer to allow the connected pin and socket to be sealed (i.e., liquid-tight) once the pin and socket fully interact. The socket can include a vent or hole 1301 to allow fluid 1303 to be pushed out of the socket as the pin is introduced into the socket, as shown in FIG. 13B. Each of the pin and/or socket can include multiple electrically conducting portions 1302 to enable a single pin and socket pair to provide multiple electrical connections. A protective element can at least partially surround a pin to prevent it from bending.

Figure 14A:
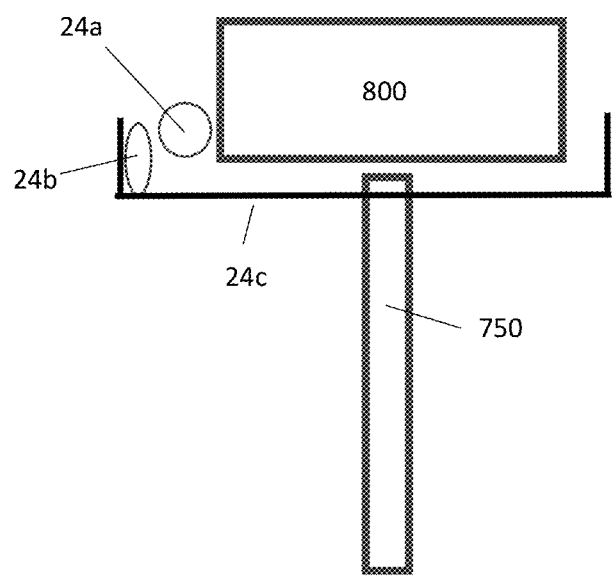
FIG. 14A-14B illustrate an embodiment of a first electrically conducting element that is located on the control handle distal of the hemostatic valve.
Figure 14B:
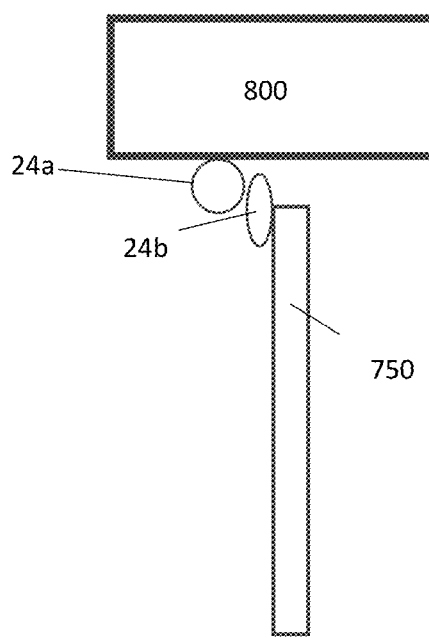

As shown in FIG. 14A-14B, it is possible for the first electrically conducting element to be located distal of the hemostatic valve. A surface 800 of the control handle that is distal of the hemostatic valve can include at least one first electrically conducting element 24a that projects outward (e.g., away from the center lumen of the control handle, such as towards an external face of the hemostatic valve) as shown in FIG. 14A or inward (e.g., toward the center lumen of the control handle) as shown in FIG. 14B and completes a circuit with at least one second electrically conducting element 24b on a proximal end of the diagnostic or treatment catheter. The at least one second electrically conducting element 24b can be configured so as to interact with an outwardly projecting first electrically conducting element 24a (e.g., the second electrically conducting element 24b can project outward or inward from the surface of the diagnostic or treatment catheter to complete a circuit with an outwardly projecting first electrically conducting element 24a located on a surface 800 of the control handle distal of the hemostatic valve) or an inwardly projecting first electrically conducting element 24a (e.g., the second electrically conducting element 24b is located on or proximal the surface of the diagnostic or treatment catheter) to complete a circuit with an inwardly projecting first electrically conducting element 24a that projects into the central lumen of the control handle. In an example, multiple first electrically conducting elements 24a project radially from the distal surface 800 of the control handle, either outwardly on an external face of the hemostatic valve or inwardly towards the center lumen of the control handle, and are configured to form a circuit with multiple second electrically conducting elements 24b that project radially outwardly from the surface of the diagnostic or treatment catheter to interact with first electrically conducting elements 24a on a surface 800 of the control handle distal of the hemostatic valve, or with first electrically conducting elements 24a on a surface 800 of the control handle distal of the hemostatic valve that project inwardly towards the center lumen of the control handle. In an example, a first electrically conducting element 24a is present on a surface 800 on the control handle distal of the hemostatic valve of the hemostatic valve, and a second electrically conducting element 24b is present on a portion 24c of the diagnostic or treatment catheter that is configured to cover or interact with the surface 800 on the control handle distal of the hemostatic valve, as shown in FIG. 14A.

Any of the first and second electrically conducting elements 24a, 24b discussed herein can be combined with any of the proximity sensing elements, neutral indicators, visual indicators, and/or auditory indicators discussed herein.

The diagnostic or treatment catheter 750 described herein can include, for example and not limitation, a dilator, a transseptal needle, a mapping catheter, and/or an ablation catheter.

Figure 3:
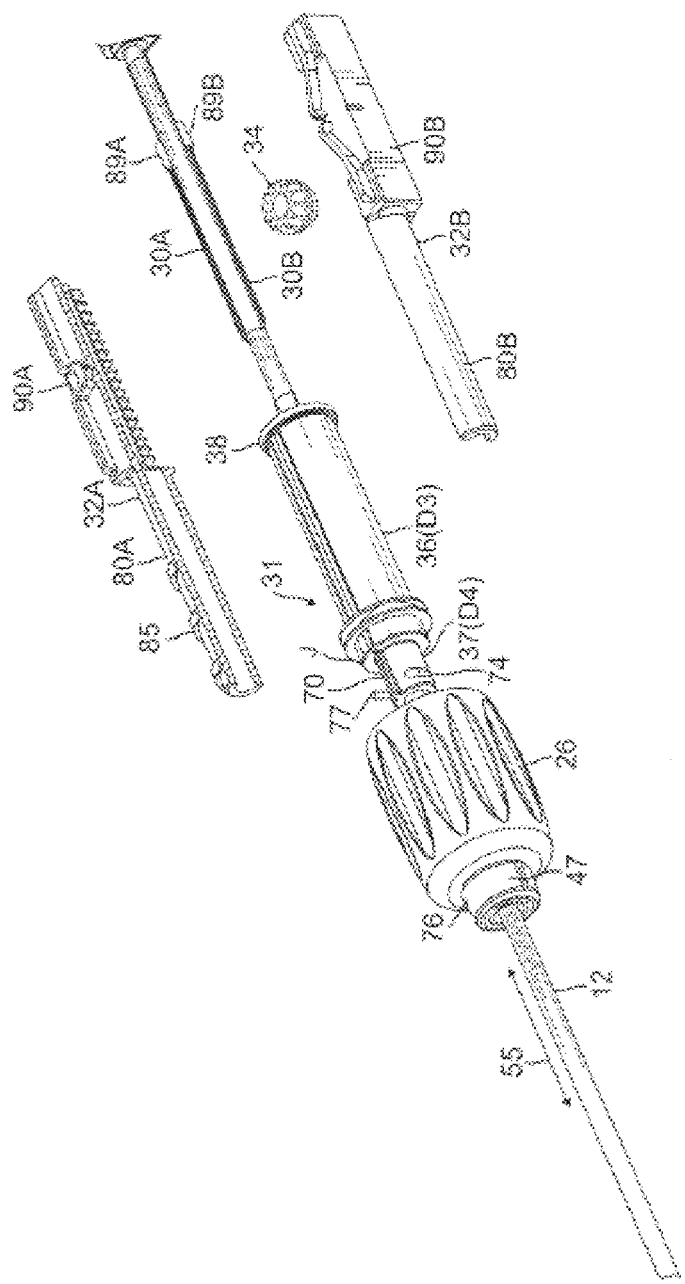
FIG. 3 is an exploded view of the control handle of FIG. 1, with a housing removed.

As shown in FIG. 2 and FIG. 3, the control handle 16 includes an elongated, generally cylindrical main body 24 with a narrower distal portion or stem 25, and a distal rotational control knob 26 mounted on the distal portion stem 25. The main body 24 has an outer shell-half member formed to define an interior volume V and whose edges 51 meet along a longitudinal seam. The distal stem 25 of the main body has a smaller outer diameter D1 compared to the outer diameter D2 of a proximal portion of the main body 24. The control knob 26 is configured for rotation by a user's thumb and forefinger when the user is grasping the main body 24 of the control handle 16. To enable deflection of the deflection section 14 of the guiding sheath 12 via first and second puller wires 30A and 30B, the control handle 16 includes in its interior volume V a rotatable shaft 31, first and second shuttles 32A and 32B, and a pinion 34. The rotatable shaft 31 is responsive to the control knob 26 in driving first shuttle 32A to move linearly along a longitudinal axis 55 in a first direction, and the pinion 34 couples the second shuttle 32B to the first shuttle 32A such that the second shuttle 32B moves linearly along the longitudinal axis in a second direction opposition to the first direction. With proximal ends of the first and second puller wires 30A and 30B anchored, or at least coupled, to the first and second shuttles 32A and 32B, respectively, such coupled and opposite translational movement of the first and second shuttles actuate the first and second puller wires for bi-directional deflection of the deflection section 14 of the guiding sheath 12.

The rotatable shaft 31 has a main proximal section 36 with an outer diameter D3, a shorter distal section 37 with an outer diameter D4, and a step junction J therebetween between sections 36 and 37. In the illustrated embodiment, the diameter D3 is greater than the diameter D4, but it is understood that the two diameters may be generally equal or the diameter D4 may be greater than the diameter D3. As better seen in FIG. 2, the rotatable shaft 31 is situated relative to main body 24 of the control handle 16 such that its proximal section 36 extends through both the main body 24 and the distal stem 25 of the control handle 16 and past a distal end of the distal stem 25, with the junction J and the distal section 37 being distal of the distal stem 25 of the main body 24 so that the distal section 37 is not surrounded by the distal stem 25. The rotatable shaft 31 is connected and affixed at its proximal end to the main body 24 by a proximal outer circumferential lip 38 that engages with an inner circumferential slot defined between circumferential flanges 40 formed in the interior volume V of the main body 24.

Figure 4:
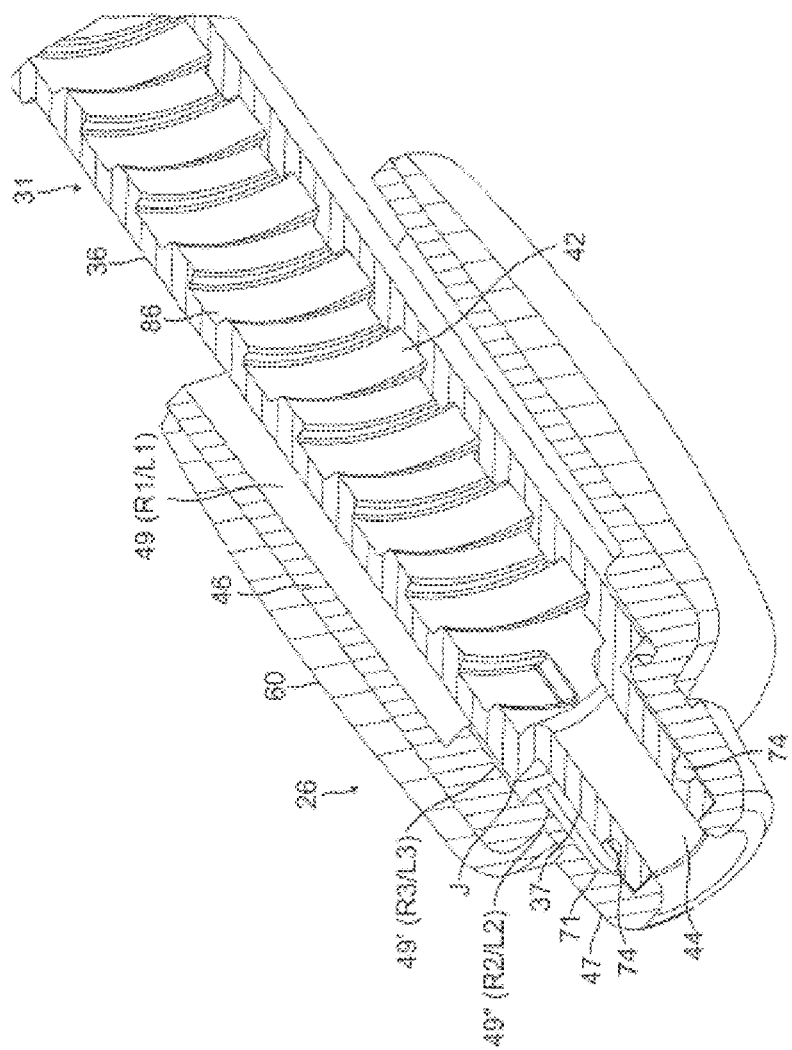
FIG. 4 is a longitudinal cross-sectional view of a distal portion of the control handle of FIG. 1, including a control knob.

With reference to FIG. 4, the rotatable shaft 31 is hollow having an interior passage 42. The passage 42 is in communication with a distal inlet 44 whose diameter is merely slightly greater than the diameter of the guiding sheath 12. The passage 42 is threaded and has a diameter to accommodate both the guiding sheath 12 and the shuttles 32A and 32B circumferentially surrounding the guiding sheath 12, as discussed below in further detail.

The control knob 26, which is mounted on the distal stem 25 of the main body 24 of the control handle 16 and the rotatable shaft 31, has a main proximal portion 46 and a short distal end portion 47. The control knob 26 is generally cylindrical with a longitudinal hollow interior that extends through its entire length. The hollow interior has a main proximal section 49, a mid-section 49' and a distal section 49". The main proximal section 49 of the hollow interior is defined by a greater first radius R1 and a greater first length L1 to accommodate and circumferentially surround the guiding sheath 12 and the shuttles 32A and 32B. The distal section 49" of the hollow interior is defined by a lesser second radius R2, where R1>R2, and a shorter second length L2, where L1>L2, to accommodate and circumferentially surround the guiding sheath 12 and the distal section 37 of the rotatable shaft 31. The mid-section 49' of the hollow interior is defined by a third radius R3, where R1>R3>R2, and a third length L3, where L1>L3, to accommodate and circumferentially surround the guiding sheath 12 and the junction J of the rotatable shaft 31. A friction-inducing cover 60 may be mounted on an outer surface of the control knob 26 for the user's ease and comfort in manipulating and rotating the control knob relative to the main body 24 of the control handle 16.

To rotationally couple the rotatable shaft 31 to the control knob 26, an outer surface of the distal section of the shaft has a longitudinal ridge 70 (FIG. 3) that is received in and engages with a corresponding longitudinal recess 71 (FIG. 4) formed an inner surface defining the hollow interior 49" of the control knob 26. To translationally affix the control knob 26 to the rotatable shaft 31 and hence the main body 24, the outer surface of the shaft 31 also has one or more linear slots 74 oriented perpendicularly to the longitudinal axis of the rotatable shaft 31. Each slot 74 is aligned with a respective hole 76 (FIG. 5) formed through a side of the distal end portion 47 of the control knob 26, so that a respective pin 77 may be inserted into the hole 76 and the slot 74 to couple the control knob 26 and the rotatable shaft 31.

It is understood that other embodiments of the guiding sheath assembly may provide a rotatable shaft 31 with an exposed portion for direct manipulation by a user, without the control knob 26.

Figure 5:
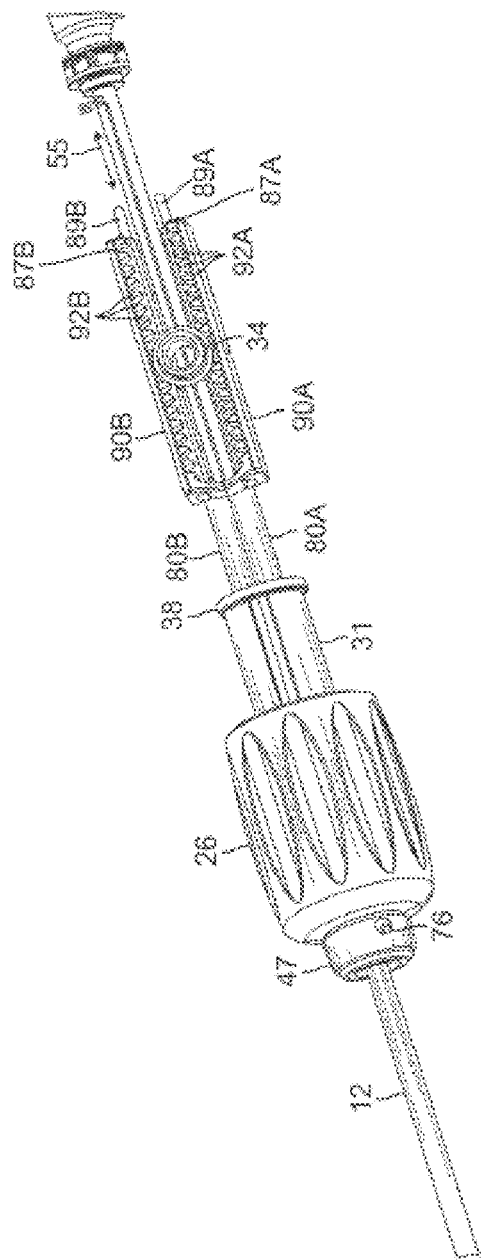
FIG. 5 is a perspective view of the control handle of FIG. 1, with the housing removed.

As shown in FIG. 3 and FIG. 5, the shuttles 32A and 32B have a similar construction to each other, with the understanding that each is generally a mirror image of the other, although the first shuttle 32A is driven by the rotatable shaft 31 and second shuttle 32B is driven by the first shuttle 32A via the pinion 34 situated between them. Each shuttle 32A and 32B has a respective elongated body having a distal portion 80A and 80B with a C-shaped end cross-section, and a respective proximal rack portion 90A and 90B with a respective plurality of teeth 92A and 92B arranged longitudinally. The first and second shuttles are arranged to face each other and engage the pinion 34 such that the distal portions 80A and 80BC together can form a cylindrical form with an outer circumferential surface that fits within the threaded passage 42, and an inner circumferential surface that defines a passage 93 for the guiding sheath 12 to pass through. As shown in FIG. 5, the rack portion 90A and 90B of each shuttle faces each other with the pinion 34 in between so that the teeth 92A and 92B of each rack portion can engage with teeth of the pinion 34 which is mounted for rotation about an axis perpendicular to the longitudinal axis 55 of the control handle 16.

With reference to FIG. 2 and FIG. 3, an outer surface of the distal portion 80A of the first shuttle 32A is configured with an external or male threaded surface 85. An inner circumferential surface of the rotatable shaft 31 is configured with an internal or female threaded surface 86 (FIG. 4) which receives the male threaded surface 85 of the first shuttle 32A for coupling the first shuttle 32A and the rotatable shaft 31 in converting rotational movement of the rotatable shaft 31 into translation movement of the first shuttle 32A. In contrast, the outer surface of the distal portion 80B of the second shuttle 32B is smooth, without any feature engaging the threaded female surface of the rotatable, so that it can move independently of the threaded male surface 85. Accordingly, as a user rotates the control knob 26 in a first direction, the rotatable shaft 31 which is rotationally coupled to the control knob 26 via the longitudinal ridge 70 also rotates. With the rotatable shaft 31 rotationally and translationally locked to the control knob 26 via the longitudinal ridge 70 and the one or more pins 77, rotation of the shaft 31 drives the first shuttle 32A to translate along the longitudinal axis in a first direction (for example, proximally). As the first shuttle 32A translates, its teeth 92A drive the pinion 34 to rotate in a first direction (for example, clockwise), which in turn drives the second shuttle 32B to translate along the longitudinal axis 55 in a second direction opposite of the first direction (for example, distally). So arranged, the male and female threaded surfaces 85 and 86 convert rotational movement of the control knob 26 into linear movement of the shuttles 32A and 32B. With proximal ends of the first and second puller wires 30A and 30B anchored, coupled or otherwise responsive to the first and second shuttles 32A and 32B, respectively, linear and opposite movements of the shuttles actuate the puller wires for bi-directional deflection of the deflection section 14 of the guiding sheath 12. In the illustrated embodiment, the proximal ends of the puller wires 30A and 30B are coupled to the rack portions 90A and 90B of the shuttles 32A and 32B, respectively. Thus, when one puller wire is drawn proximally under tension by its respective shuttle, the other puller wire is simultaneously released from tension by its respective shuttle moving distally.

As shown in FIG. 2, a proximal end segment of each puller wire 30A and 30B extends outside of the sheath 12, in a respective longitudinal channel 88A and 88B formed in the proximal rack portion 90A and 90B of each shuttle 32A and 32B. As shown in FIG. 5, a stop 89A and 89B, for example, a hypotube, is affixed to the proximal end of each puller wire 30A and 30B, and the stop is positioned proximal of a proximal end 87A and 87B of the respective rack portion 90A and 90B so that the rack portion can push or otherwise act on the stop 89A and 89B, respectively, to draw the puller wire 30A and 30B proximally when the shuttle 32A and 32B is moved proximally. When a shuttle 32A and 32B is moved distally, the proximal end of the rack portion 90A and 90B comes out of contact with the stop 89A and 89B, releasing the puller wire 30A and 30B from tension. It is understood that the stop 89A and 89B may also be embedded or otherwise anchored to the rack portion or any part of the shuttle to effect deflection of the sheath.

Because the first and second shuttles 32A and 32B move in opposite directions along the longitudinal axis 55, an initial positioning of the shuttles relative to each other and to the passage 42 is made during assembly of the control handle 16. For example, as shown in FIG. 2, each shuttle is positioned in the passage 42 of the rotatable shaft 31 such that they are even with each other along the longitudinal axis 55, and each has a distal end positioned generally at midpoint along the passage 42 so that each shuttle has sufficient room to move correspondingly proximally or distally within the rotatable shaft 31. The stops 89A and 89B may be positioned relative to the shuttles such that there is minimal or even tension exerted on each puller wire 30A and 30B for a generally neutral guiding sheath with little, if any, deflection. So arranged, the shuttles adopt a "neutral" or initial configuration from which the user may evenly deflect the guiding sheath bi-directionally.

As shown in FIG. 5, the pinion 34 is positioned in between and relative to the shuttles 32A and 32B so that their teeth 92A and 92B remain engaged while the shuttles translate in response the user's manipulation of the control knob 26. In that regard, the length of the rack portions 90A and 90B are sufficiently long to ensure such continuous engagement.

It is understood that by changing one or more factors, including, for example, the length of the passage 42, the length of each distal portion 80A and 80B, the length of the rack portion 90A and 90B, the position of the pinion 34, and the number of pinions, different shuttle movement and deflection characteristics and limitations may be achieved, as needed or desired.

Figure 6A:
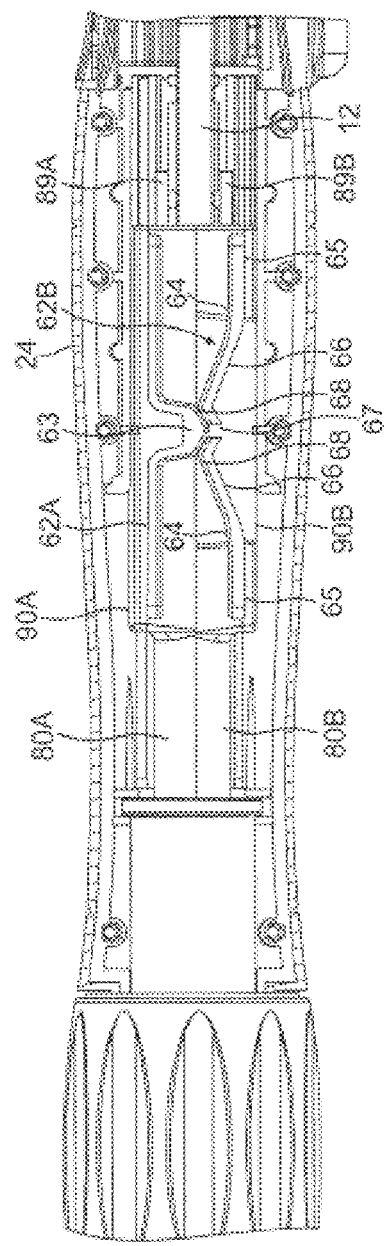
FIG. 6A is a top plan view of a neutral indicator with first and second members engaged, in accordance with one embodiment of the present invention.
Figure 6B:
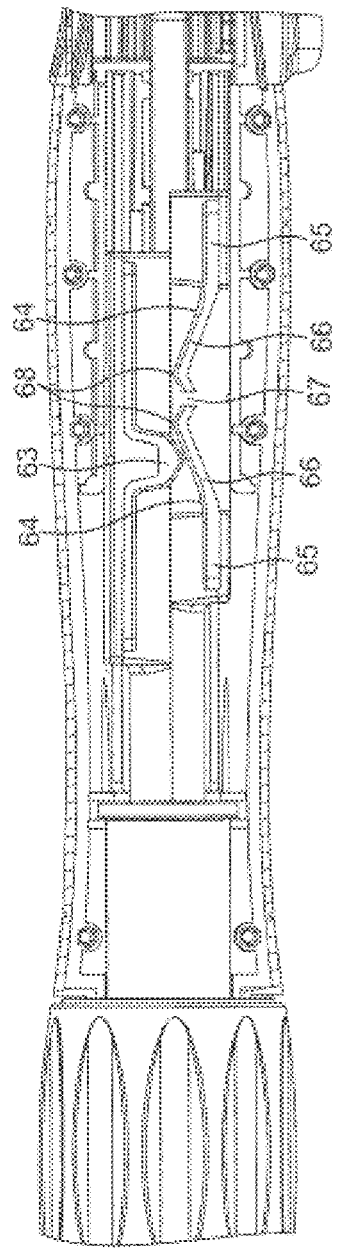
FIG. 6B is a top plan view of the neutral indicator of FIG. 6A with the first and second members disengaged.

With reference to FIG. 6A and FIG. 6B, an outer surface of each rack portion 90A and 90B, opposite of the teeth 92A and 92B, of each shuttle 32A and 32B is configured with a neutral indicator. The neutral indicator includes a first member 62A and a second member 62B configured for releasable engagement with each other to indicate a neutral position between the first and second shuttles 32A and 32B, that is, a relative position where the puller wires 30A and 30B are neutral and the guiding sheath 12 accordingly is generally straight, without deflection. In the illustrated embodiment, the first or male member 62A formed on the first shuttle 32A has a tapered projection 63 facing the second or female member 62B formed on the second shuttle 32B, which includes a pair of flexible guide rails 64 on either side, whose fixed ends 65 are affixed to the second shuttle 32B and whose free ends 66 are configured to jointly form a tapered recess 67 in which the tapered projection 63 nests when the shuttles 32A and 32B are in the neutral configuration.

Accordingly, the user is typically initially presented with the guiding sheath 12 undeflected where the first and second shuttles 32A and 32B are even with each other with the tapered projection 63 nesting in the tapered recess 67, as shown in FIG. 6A. When the user rotates the control knob 26 in one direction which drives the first and second shuttles 32A and 32B to translate in opposition directions, as shown in FIG. 6B, the tapered projection 63 disengages and moves out from the tapered recess 67 but only when the user rotates the control knob with sufficient force to flex the guide rails 64 and overcome the resistance presented by their angled ends 68. When the tapered projection 63 rides over and has moved past one of the angled ends 68, the guide rail 64 is sloped such that the resistance to movement of the tapered projection 63 decreases as the tapered projection 63 moves further away from the tapered recess 67. Thus, in rotating the control knob 26 to deflect the guiding sheath 12, the user experiences a greater or maximum resistance when the shuttles 32A and 32B initially move out of the neutral configuration, followed by increasing ease as the shuttles 32A and 32B translate in opposite directions. The control handle 16 may bear visual and/or tactile indicia to provide constant orientation of deflection direction. For example, clockwise rotation of the control knob 26 consistently deflects the shaft 12 toward the side or direction of the sideport 21, and counterclockwise rotation of the control knob 26 consistently deflects the shaft 12 toward an opposite side or direction.

Conversely, when releasing the deflection of the guiding sheath 12, the user rotates the control knob 26 in the opposite direction. As the shuttles 32A and 32B translate and approach each other and begin to laterally realign again, the tapered projection 63 and the tapered recess 67 approach each other and the user applies an increasing force to rotate the control knob 26 in order for the tapered projection 63 to ride back over the angled end 68 of a guide rail 64 before the tapered projection 63 can nest in the tapered recess 67. Accordingly, the increasing resistance posed by either of the sloped rails 64 and a greater or maximum resistance posed by an angled end 68 provides the user with a tactile feel or indication of when the tapered projection 63 is in the immediate proximity of the tapered recess 67. Engagement of the tapered projection 63 and the tapered recess 67 can provide the user with an audible "click" or signal when the flexible guide rail 64 snaps into its natural configuration when the tapered projection 63 no longer exerts any load on it.

Figure 7A:
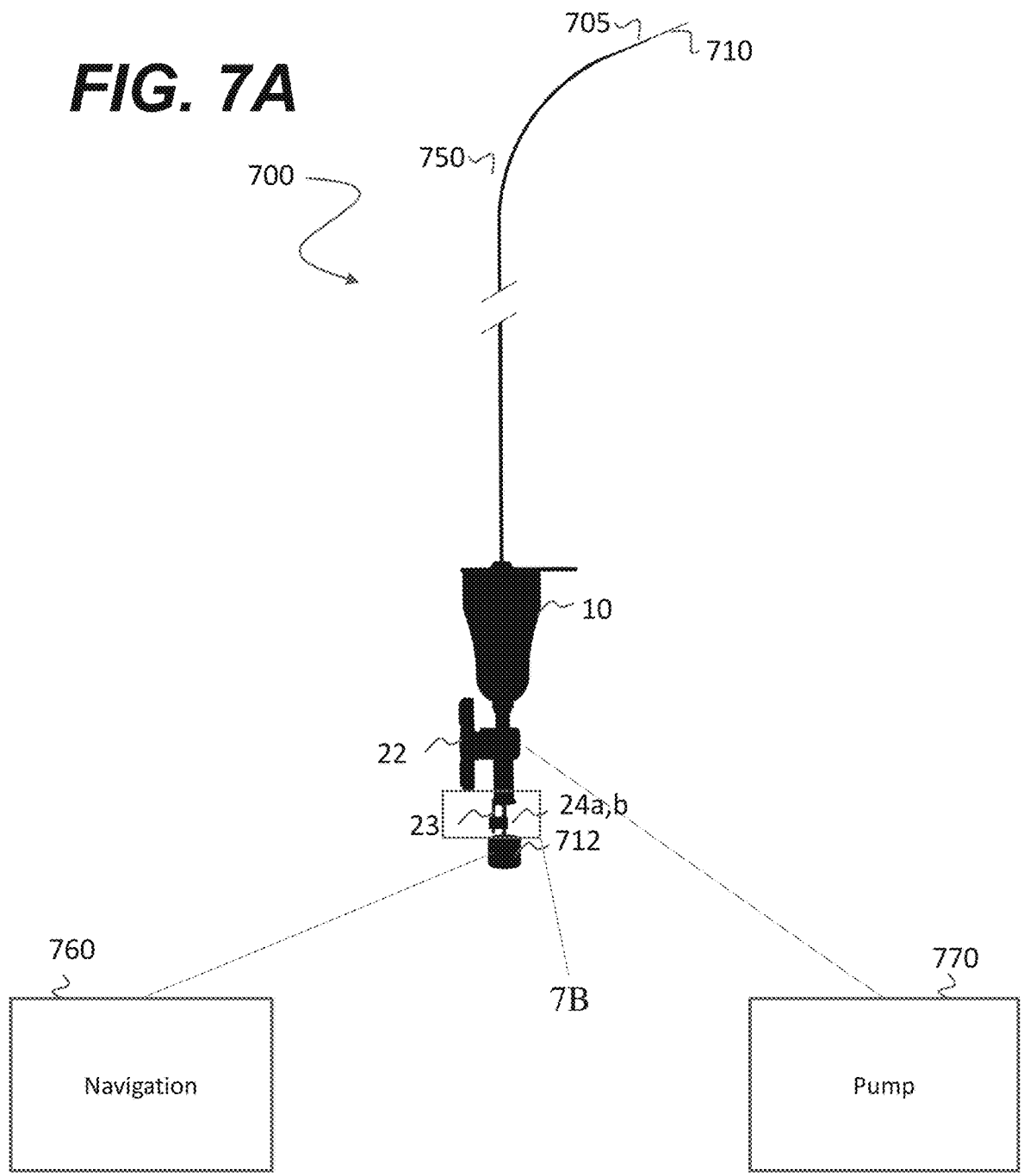
FIG. 7A shows components of a system comprising a control handle according to aspects of the present invention.
Figure 7B:
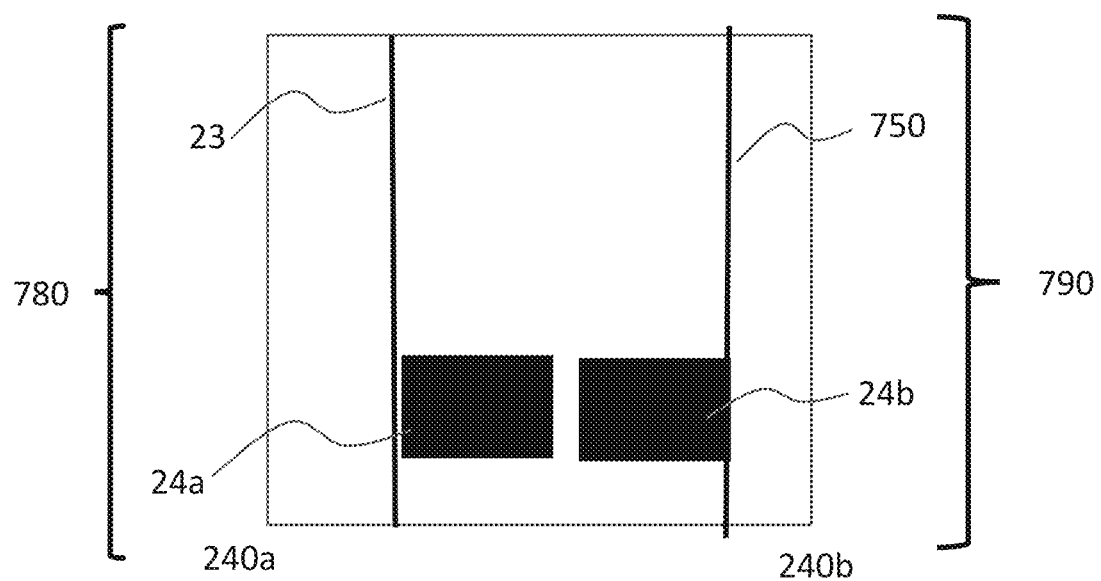
FIG. 7B shows a close-up view of area 7B in FIG. 7A, showing an alternative proximity sensing system according to aspects of the present invention.

FIGS. 7A and 7B illustrate an exemplary system 700 configured for procedures utilizing the guide sheath assemblies and control handles as described herein. This exemplary system includes a diagnostic or treatment catheter 750 and a dilator 705 and transseptal needle 710 configured to enter into a patient's heart, specifically the right atrium. A guide wire can be utilized to deliver the diagnostic or treatment catheter 750 and the dilator 705 and transseptal needle 710 to the patient's heart as is known in the art.

During transseptal perforation using the exemplary system 700, the transseptal needle 710 punctures tissue in the septum between the right and left atria, e.g., at the fossa ovalis or foramen ovale, and exits into the left atrium.

The system 700 can further include an ablating means and a pump 770. The transseptal needle 710 and/or dilator 705 can be connected to the pump 770 to provide irrigation at a treatment site as part of an ablation treatment. The dilator 705 can be sized, shaped, and otherwise configured to deliver the transseptal needle 710 to the fossa ovalis and dilate the transseptal perforation once created by the transseptal needle 710.

The system 700 can further include a navigation system 760, and the transseptal needle 710 can further include one or more sensors (e.g., magnetic field sensors) that can provide information about the location of the transseptal needle 710 to the navigation system 760. The navigation system 760 can be configured to interpret data (e.g., magnetic field data) from the sensor(s) to determine a location of the transseptal needle 710. These sensors, in one example, are located near the distal end of transseptal needle 710, during a procedure then typically located inside the patient's heart. While useful for location purposes, this system can be enhanced by the present invention.

FIG. 7B illustrates first and second proximity sensing elements 240a, 240b. These elements 240a, 240b send a signal to the navigation system 760 when they are engaged, or in very close proximity. The signal generated from the elements 240a, 240b provide another data point to the navigation system 760 to extrapolate the most distal end of the sheath, and thus its location within the patient's heart. For example and not limitation, the first and second proximity sensing elements 240a and 240b can comprise an optical sensing system or a photosensitive system wherein one of the proximity sensing elements generates an optical signal and the other proximity sensing element receives the optical signal when the elements are engaged or in very close proximity, and subsequently sends another signal indicating engagement or proximity to the navigation system 760.

In another example, the first and second proximity sensing elements 240a and 240b can comprise a magnetic sensing system wherein one of the proximity sensing elements generates a magnetic field and the other proximity sensing element senses the magnetic field when the elements are engaged or in very close proximity, and subsequently sends a signal indicating engagement or proximity to the navigation system 760. In another example, the first and second proximity sensing elements 240a and 240b can comprise a physically interacting system wherein one of the proximity sensing elements has a projection (e.g., a tongue, teeth, shaft, or tapered projection) and the other proximity sensing element is configured to receive the projection (e.g., groove(s), pinion, indentation) when the elements are engaged or in very close proximity, and subsequently sends a signal indicating engagement or proximity to the navigation system 760.

Figure 8:
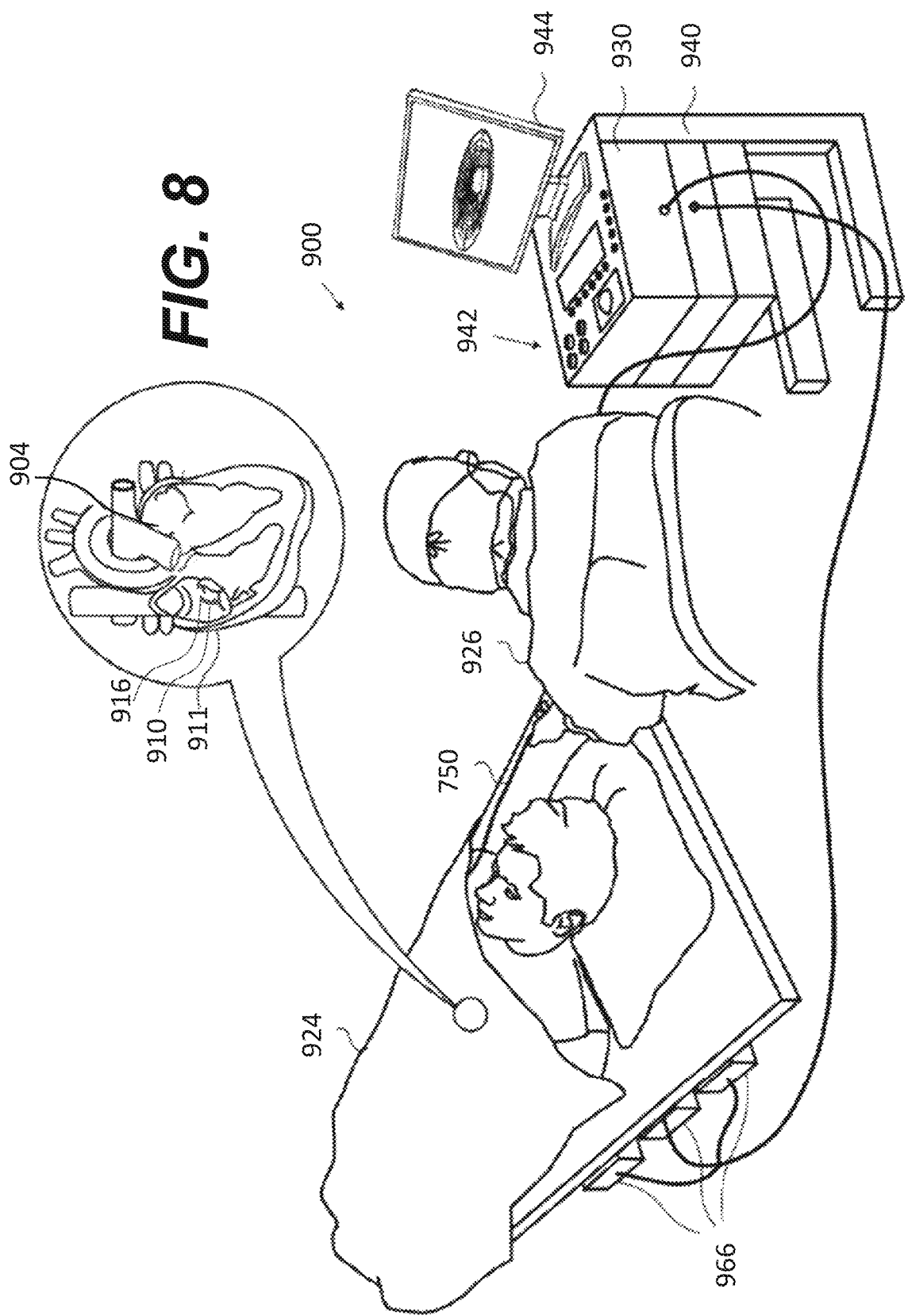
FIG. 8 is an illustration of a system comprising a control handle as described herein being used to perform a method for performing a transseptal perforation according to aspects of the present invention.

FIG. 8 is an illustration of a system 920 for using a guide sheath assembly and/or control handle as described herein to perform a method for performing a transseptal perforation. The system 920 can be used during a medical procedure on a heart 922 of a patient 924 to perform transseptal perforation. The procedure can be performed by one or more operators 926 including a medical professional. The system 920 can be configured to present images of a cavity, such as an internal chamber of heart 922, allowing operator 926 to visualize characteristics of the cavity. The system 920 can further be configured to present images of the dilator 750 and/or transseptal needle 710. The system 920 can further include or be configured to control components of the system 700 illustrated in FIG. 7A.

The system 920 can be controlled by a system processor 930 which can be realized as a general purpose computer. The processor 930 can be mounted in a console 940. The console 940 can include operating controls 942 such as a keypad and a pointing device such as a mouse or trackball that the operator 926 can use to interact with the processor 930. Results of the operations performed by the processor 930 can be provided to the operator on a display 944 connected to the processor 930. The display 944 can further present a graphic user interface to the operator enabling the operator to control the system 920, including the indication of engagement of the electrically conducting element 24a located at the proximal end 780 of the hemostatic valve 18 and the electrically conducting element 24b on the proximal end 790 of the diagnostic or treatment catheter 750. The operator 926 can be configured to use controls 942 to input values of parameters used by the processor 930 in the operation of the system 920.

The processor 930 uses computer software to operate the system 920. The software can be downloaded to the processor 930 in electronic form, over a network, for example, or it can, alternatively or additionally, be provided and/or stored on non-transitory tangible computer-readable media, such as magnetic, optical, or electronic memory.

In operating system 920, the operator 926 inserts a diagnostic or treatment catheter 960 into patient 24, so that a distal end of the catheter enters left atrium 916 of the patient's heart via the inferior vena cava 922. The operator 926 delivers the diagnostic or treatment catheter 750, such as a dilator 705 and/or a transseptal needle 710 through the diagnostic or treatment catheter 750 to the left atrium 716. The processor 730 can be configured to track the distal end of the transseptal needle 710, typically both the location and the orientation of the distal end, while it is within heart 910. The transseptal needle 710 can include tracking coil(s) at its distal end. The processor 730 can utilize a magnetic tracking system such as is provided by the Carto® system produced by Biosense Webster, of Irvine, Calif. The system 920 can include magnetic field transmitters 966 in the vicinity of patient 924, so that magnetic fields from the transmitters interact with one or more tracking coils at the distal end of the transseptal needle 710. The coils interacting with the magnetic fields generate signals which are transmitted to the processor 930, and the processor analyzes the signals to determine the location and orientation of the transseptal needle 710. In one embodiment, the tracking coils and magnetic tracking system can be used to locate the dilator 705 and transseptal needle 710 and thus to position them as needed by the operator 926.

In another embodiment, the operator 926 can insert the diagnostic or treatment catheter 750 into the hemostatic valve 18 of the guiding sheath assembly 10. The contact and completion of the circuit between electrically conducting element 24a on the proximal end of the diagnostic or treatment catheter 750 and electrically conducting element 24b on the proximal end of the hemostatic valve 18 helps enable the location and orientation of the dilator 705 and transseptal needle 710 to be visualized using the system 920. There is thus no need to irradiate the patient 924 in order for the operator 926 to determine the positioning of the dilator 705 and transseptal needle 710.

Figure 9:
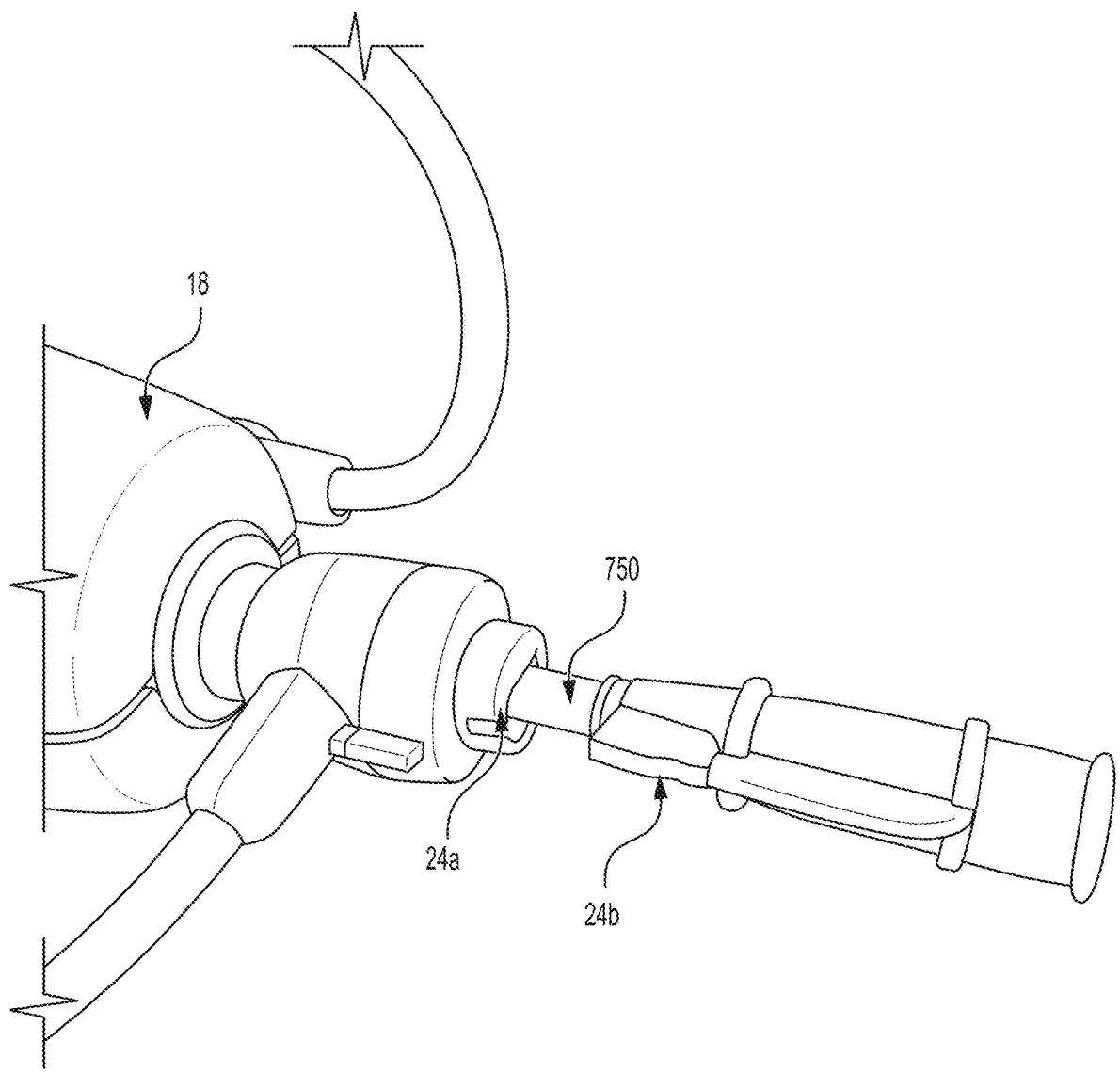
FIG. 9 illustrates a magnified example of the hemostatic valve and the transseptal needle before full insertion.
Figure 10:
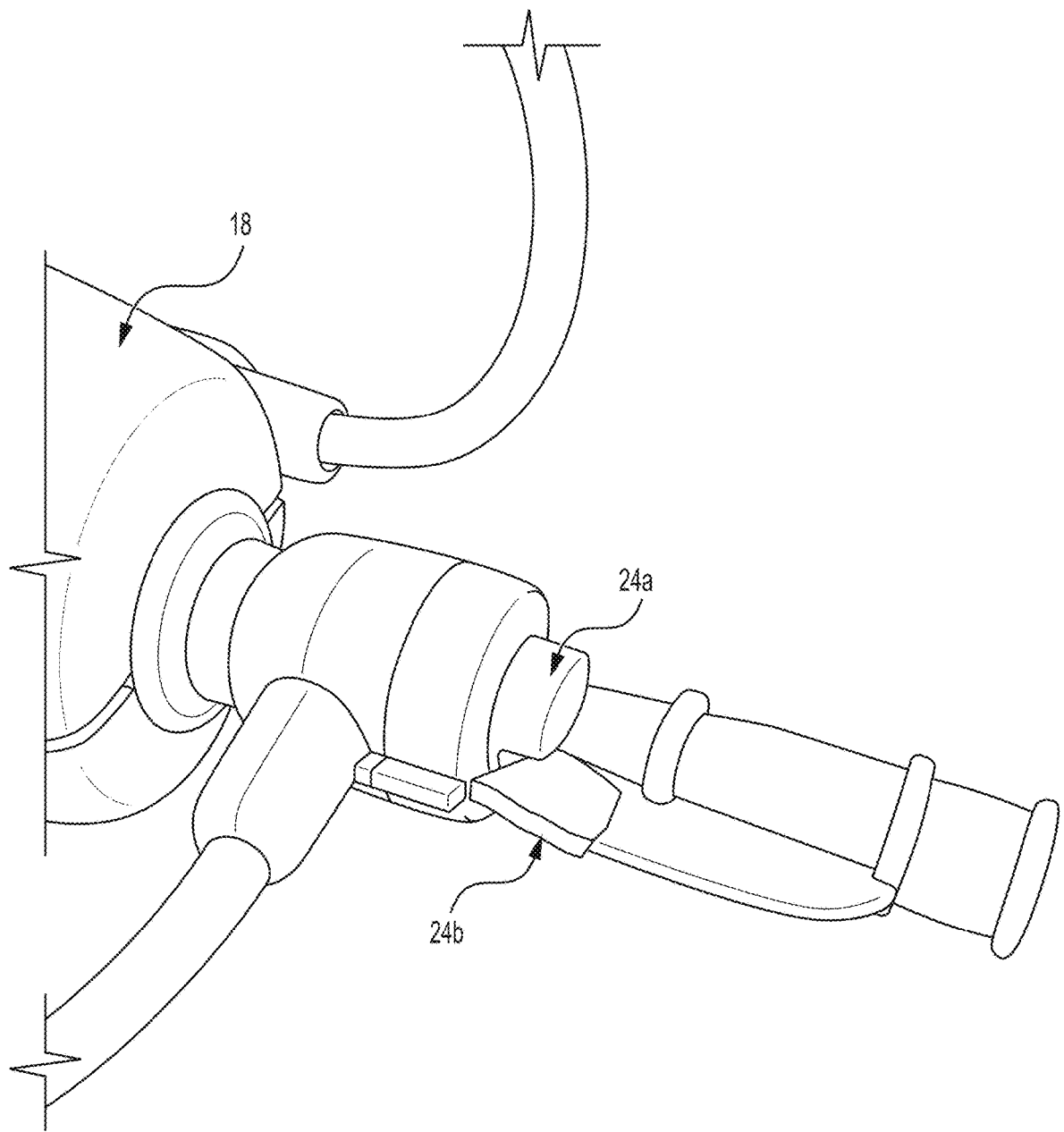
FIG. 10 illustrates a magnified example of the hemostatic valve and the transseptal needle at full insertion.

FIGS. 9 and 10 further illustrate the concept above. FIG. 9 illustrates an example of a diagnostic or treatment catheter 750, and its sheath assembly 10, partially inserted into the hemostatic valve 18. Here, the circuit between electrically conducting elements 24a, 24b is not closed, so there is no identifying indication of the most proximal end of the diagnostic or treatment catheter 750. In FIG. 10, the circuit between electrically conducting elements 24a, 24b at the proximal ends 780, 790 of the hemostatic valve and the diagnostic or treatment catheter is closed, thereby sending a signal to the mapping/navigation systems to inform the system of another data point in locating the most distal end.

Example catheters 750 can be visualized in in mapping/navigation software systems 760 but there are still a large number of physicians that require the use of fluoroscopy. The reason for the use of fluoroscopy is due to the physician needing to know where the most distal end of the catheter 750 is located in the patient's heart and relative to important structures (e.g., septum). The end of an exemplary treatment catheter 750 (e.g., dilator) is the portion of the system that punctures and then crosses into the left atrium first. The above systems allow an operator to know where exactly the end of the diagnostic or treatment catheter 750 is based on extrapolation from the distal end of the guiding sheath assembly 10. What is not currently known by the system 760 to make this extrapolation is when the diagnostic or treatment catheter is fully engaged into the guiding sheath assembly 10. By including first and second proximity sensing elements 240a, 240b (e.g. electrically conducting elements 24a, 24b) onto the hemostatic valve 18 of the guiding sheath assembly 10 and the luer of the diagnostic or treatment catheter 750 that connects to the guiding sheath assembly 10, the navigation system 760 can now recognize when the diagnostic or treatment catheter 750 is fully engaged to the guiding sheath assembly 10. The mapping system 760 recognizes this due to the diagnostic or treatment catheter 750 having a similar conductive surface at the face of the luer on the hemostatic valve 18 where the diagnostic or treatment catheter 750 and guiding sheath assembly 10 connect. The conduction element on the sheath 24b can have an electrical break that can only be completed when the diagnostic or treatment catheter 750 is fully engaged and the electrically conductive portion on the diagnostic or treatment catheter 750 end 24b completes the circuit. There are additional examples to allow the navigation system 760 to be informed of the full engagement between the guiding sheath assembly 10 and the diagnostic or treatment catheter 750. Other examples include incorporating a sensor or distal ring on the diagnostic or treatment catheter 750, replacing the conductive surface described above with a photosensor or other optical sensor, magnetic field sensor, or similar proximity detector.

Figure 11:
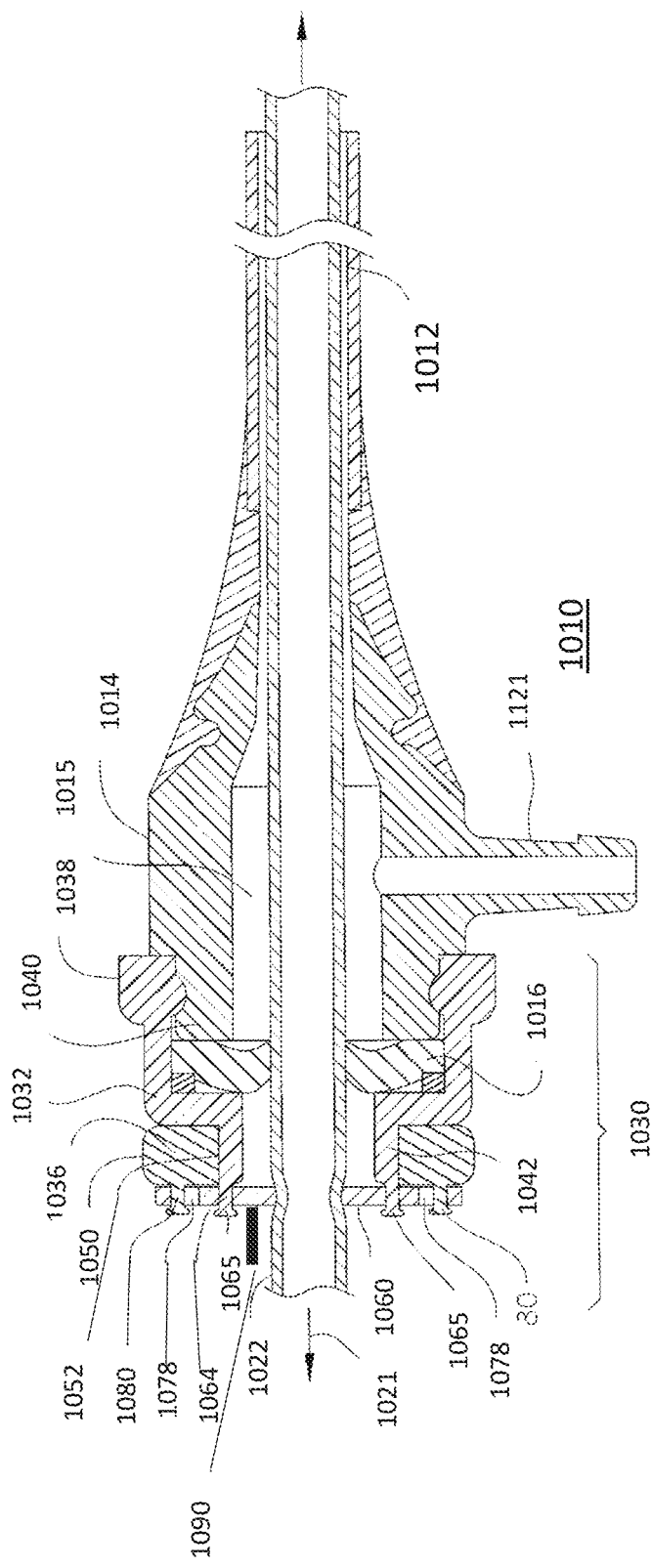
FIG. 11 illustrates a cross-section of another embodiment of a guiding sheath including a control handle, in accordance with an embodiment of the present invention.

FIG. 11 shows a cross-sectional view of another embodiment of a guiding sheath assembly 1010. This guiding sheath assembly 1010 comprises a sensor 1090 which can be used to detect when the guiding sheath assembly 1010 is inserted to a certain depth. The sensor 1090 can be an electrically conducting sensor, a photosensor or other optical sensor, or a magnetic field sensor. The guiding sheath assembly 1010 has a hub 1014 and a tubular sheath 1012 attached to the distal end of hub 1014. The guiding sheath assembly includes a hemostasis valve 1016 to provide sealing of the sheath 1012 around a catheter tubular body 1022 that extends along a longitudinal axis 1021 of the sheath introducer through a central lumen 1015 that extends through the hub 1014 and the sheath 1012. A branch conduit 1020 and a locking sleeve 1121 off of hub 1014 are provided to allow for, among other things, connections to saline solution or medicines and access to other medical procedures. It is understood that a guide wire or diagnostic or treatment catheter 750 may also be extended through the guiding sheath assembly as it is often used with catheters. Sheath introducers or assemblies are described in U.S. Pat. Nos. 5,807,350 and 10,194,937, the entire contents of which are hereby incorporated by reference.

Mounted proximally of the hub is a releasable rotational lock assembly 1030 that includes an end cap 1032 and a user interface 1034. In the embodiment shown in FIG. 11, the user interface includes a knob 1036. The end cap 1032 is provided at the proximal end of hub 1014 to cover and secure the hemostasis valve 1016. The end cap 1032 has a distal portion 1038 that snap fits with a proximal circumferential portion 1040 of the hub 1014. The end cap 1032 at its proximal end is configured with a neck portion 1042 that defines an axial opening 1044 leading to the central lumen 1015 of the guiding sheath assembly 1010. Mounted on the neck portion 1042, the knob 1036 is shaped as a disc with a circumferential edge 1050, with an outer diameter generally equal to that of the end cap 1032. The knob 1036 has a central hole 1052 that receives the neck portion 1042 of the end cap 1032 and allows the knob 1036 to be bi-directionally rotatable and adjustable about the longitudinal axis 1021 of the guiding sheath assembly 1010.

The rotational lock assembly 1030 further includes a plurality of locking members or prongs 1060 mounted on a proximal face of the end cap 1032 that are adapted to contact and grip the catheter tubular body 1022 extending through the guiding sheath assembly 1010 when the knob 1036 is rotated in one direction and to release the tubular body 1022 when the knob 1036 is rotated in the other direction. Arranged in a radial pattern generally equidistant and equiangular to each other, the prongs 1060 are each fixedly but rotationally or pivotally (used interchangeably herein) mounted on a respective pin 1064 formed as a projection from a proximal end of the neck portion 1042. The pins 1064 extend parallel to the longitudinal axis 1021 of the guiding sheath assembly 1010. A proximal end of each pin has a head 1065 which retains the prong 1060 on the pin 1064, and in turn, the knob 1036 on the neck portion 1042 of the hub 1014.

The aperture 1078 enables the engagement of a respective cam actuator or pin 1080, formed as a projection extending from a proximal face of the knob 1036, with a cam portion of the prong 1060 in coupling a rotational motion of the knob 1036 and a rotational motion of each of the prongs 1060.

The guiding sheath assembly 1010 can also include electrically conducting element 24a (not shown) on the hemostatic valve 1016 that is configured to interact with another electrically conducting element 24b located on the proximal end of the diagnostic or treatment catheter 750 in order to indicate engagement of the diagnostic or treatment catheter 750 with the hemostatic valve 1016. This engagement completes a circuit between the hemostatic valve 1016 and the proximal end of the diagnostic or treatment catheter 750. This engagement can be indicated by a visual or auditory signal provided to the computer system shown in FIG. 8.

The preceding description has been presented with reference to presently preferred embodiments of the invention. Workers skilled in the art and technology to which this invention pertains will appreciate that alterations and changes in the described structure may be practiced without meaningfully departing from the principal, spirit and scope of this invention. Any feature or structure disclosed in one embodiment may be incorporated in lieu of or in addition to other features of any other embodiments, as needed or appropriate. As understood by one of ordinary skill in the art, the drawings are not necessarily to scale. Accordingly, the foregoing description should not be read as pertaining only to the precise structures described and illustrated in the accompanying drawings, but rather should be read consistent with and as support to the following claims which are to have their fullest and fair scope.

What is claimed is:

1. A system comprising:
    a guiding sheath assembly, comprising:
        an elongated shaft defining a lumen extending along a longitudinal axis;
        a control handle proximal of the shaft, the control handle comprising:
            a hemostatic valve on a proximal end of the control handle; and
            at least one first electrically conducting element disposed on at least one of the control handle and the hemostatic valve;
    a catheter comprising a transseptal needle, the catheter including (1) one or more location sensors configured to output a first signal corresponding to a location of a distal end of the transseptal needle within a patient's heart and (2) at least one second electrically conducting element disposed on a proximal end of the catheter such that the at least one first electrically conducting element is configured to interact with the at least one second electrically conducting element to complete an electrical circuit to output a second signal when the catheter is introduced into the lumen of the elongated shaft; and
    a mapping system comprising a processor configured to:
        receive the first signal from the one or more location sensors corresponding to the location of the distal end of the catheter;
        receive the second signal from the completed electrical circuit;
        extrapolate the location of a distal end of the guiding sheath assembly based at least in part on the first signal and the second signal; and
        determine a distal-most end of the catheter based at least in part on the extrapolated location of the distal end of the guiding sheath assembly.

2. The system of claim 1, wherein the at least one first electrically conducting element is located on a proximal end of the hemostatic valve and the at least one second electrically conducting element is located on a proximal end of the catheter.

3. The system of claim 1, wherein the circuit can be configured to provide a visual or auditory indicator upon completion of the electrical circuit.

4. The system of claim 3, wherein the visual or auditory indicator can be provided to a system configured to interact with the guiding sheath assembly.

5. The system of claim 1, wherein the hemostatic valve further comprises:
    a valve body extending along the longitudinal axis from a proximal portion to a distal portion of the valve body; and
    a sensor disposed proximate the proximal portion of the valve body so that when an instrument is inserted into the hemostatic valve, an indication is provided of a predetermined insertion distance of the instrument through the lumen.

6. The system of claim 1,
    wherein the at least one first electrically conducting element is located on a proximal end of the hemostatic valve and projects one of outward or inward and completes the circuit with at least one second electrically conducting element on a proximal end of the catheter, the outward direction is away from the lumen of the control handle, and the inward direction is toward the lumen of the control handle.

7. A system comprising:
    a catheter comprising a transseptal needle;
    a guiding sheath assembly comprising:
        an elongated shaft defining a lumen and extending along a longitudinal axis;
        a control handle proximal of the elongated shaft and comprising:
            a control knob configured for rotation about the longitudinal axis;
            a hollow rotatable shaft configured for rotation about the longitudinal axis in response to rotation of the control knob;
            a hemostatic valve on a proximal end of the control handle and coupled to the lumen; and
            a plurality of first proximity sensing elements disposed asymmetrically about a circumference of at least one of the control handle and the hemostatic valve;
    a catheter comprising a transseptal needle, the catheter comprising (1) one or more location sensors configured to output a first signal corresponding to a location of a distal end of the transseptal needle within a patient's heart and (2) a plurality of second proximity sensing elements disposed asymmetrically about a circumference of the catheter so that when the plurality of first proximity sensing elements interacts with the plurality of second proximity sensing elements a second signal;
    a mapping system comprising a processor configured to:
        receive the first signal;
        receive the second signal;
        extrapolate the location of a distal end of the guiding sheath assembly based at least in part on the first signal and the second signal; and
    determine a distal-most end of the catheter based at least in part on the extrapolated location of the distal end of the guiding sheath assembly.

8. The system of claim 7, wherein the plurality of first proximity sensing elements is located on a proximal end of the hemostatic valve and the second plurality of proximity sensing elements is located on a proximal end of a dilator of the catheter, the dilator configured to be inserted into the lumen.

9. The system of claim 7, wherein the first and second pluralities of proximity sensing elements comprise a photosensor, an optical sensor, a magnetic field sensor, and physically interacting elements.

10. The system of claim 9, wherein the plurality of first proximity sensing elements comprises a projection and the plurality of second proximity sensing elements is configured to receive the projection, and wherein an engagement or close proximity of the first and second pluralities of proximity sensing elements provides a visual and/or auditory indicator.

11. The system of claim 7, wherein the hemostatic valve further comprises:
 a valve body; and
 a sensor disposed on the valve body so that when the catheter is inserted into the hemostatic valve, an indication is provided of a predetermined insertion distance of the catheter through the lumen.

12. The system of claim 7, further comprising:
 a first shuttle configured to be driven in a linear first direction along the longitudinal axis by the rotatable shaft in response to the control knob interacting with the rotatable shaft and a second shuttle; and
 a pinion coupling the first shuttle and the second shuttle, the second shuttle configured to be driven in a second linear direction opposite the first linear direction and along the longitudinal axis by the pinion to cause the guiding sheath to deflect.

13. The system of claim 12, further comprising a neutral indicator comprising a first member positioned on the first shuttle, the first member comprising a tapered projection.

14. The system of claim 13, further comprising a second member comprising a pair of flexible guide rails such that a fixed end of each flexible guide rail is connected to the second shuttle and a free end of each flexible guide rail together forms a recess that is configured to receive the tapered projection of the first member.

15. A system comprising:
 a guiding sheath assembly, comprising:
  an elongated shaft defining a lumen extending along a longitudinal axis;
  a control handle proximal of the elongated shaft, the control handle comprising:
   a hemostatic valve comprising;
    a valve body extending along a longitudinal axis to define a lumen extending through a portion of the valve body;
    a branch conduit in communication with the lumen; and
    a seal interposed in the lumen to separate a proximal portion and a distal portion of the valve body, the distal portion in communication with the branch conduit; and
   a plurality of first conductive components disposed proximate the hemostatic valve;
 a catheter comprising a transseptal needle, the catheter including (1) one or more location sensors configured to output a first signal corresponding to a location of a distal end of the transseptal needle within a patient's heart and (2) a plurality of second conductive components disposed on a proximal end of the catheter such that the plurality of first conductive components is configured to interact with the plurality of second conductive components to complete an electrical circuit to output a second signal when the catheter is inserted into the hemostatic valve to indicate a predetermined insertion distance and an orientation of the catheter through the lumen; and
 a mapping system comprising a processor configured to:
  receive the first signal from the one or more location sensors corresponding to the location of the distal end of the catheter;
  receive the second signal from the completed electrical circuit;
  extrapolate the location of a distal end of the guiding sheath assembly based at least in part on the first signal and the second signal; and
  determine a distal-most end of the catheter based at least in part on the extrapolated location of the distal end of the guiding sheath assembly.

16. The system of claim 15, wherein the catheter further comprises a guide wire or a diagnostic or treatment catheter.

17. The system of claim 16, wherein the catheter further comprises a dilator.

* * * * *